US007465108B2

(12) United States Patent
Brown

(10) Patent No.: US 7,465,108 B2
(45) Date of Patent: *Dec. 16, 2008

(54) TEMPORARY SURVEILLANCE SYSTEM

(75) Inventor: Stephen F. Brown, Beach, CA (US)

(73) Assignee: Cam Guard Systems, Inc., Ontario, CA (US)

( * ) Notice: Subject to any disclaimer, the term of this patent is extended or adjusted under 35 U.S.C. 154(b) by 554 days.

This patent is subject to a terminal disclaimer.

(21) Appl. No.: 10/782,532

(22) Filed: Feb. 19, 2004

(65) Prior Publication Data

US 2004/0258404 A1 Dec. 23, 2004

Related U.S. Application Data

(63) Continuation-in-part of application No. 10/128,589, filed on Apr. 23, 2002, now Pat. No. 6,709,172, and a continuation-in-part of application No. 10/127,017, filed on Apr. 19, 2002, now Pat. No. 6,709,171, and a continuation-in-part of application No. 09/958,706, filed on Feb. 7, 2002, now Pat. No. 6,585,428, and a continuation-in-part of application No. PCT/US01/04533, filed on Feb. 12, 2001, which is a continuation-in-part of application No. 09/502,028, filed on Feb. 10, 2000, now Pat. No. 6,375,370.

(51) Int. Cl.
*G03B 17/00* (2006.01)
*H04N 7/18* (2006.01)
(52) U.S. Cl. .................. 396/427; 396/427; 396/428; 352/132; 352/243; 348/143; 348/159; 348/373
(58) Field of Classification Search ............ 396/419, 396/427, 428; 352/132, 243; 348/143, 144, 348/149, 151, 153, 158, 159, 373; 340/908, 340/937; 248/177.1, 178.1
See application file for complete search history.

(56) References Cited

U.S. PATENT DOCUMENTS 3,254,340 A * 5/1966 Sealander .................. 342/169

(Continued)

OTHER PUBLICATIONS

U.S. District Court, Central District of California (Western Division—Los Angeles) Civil Docket for Case #: 2:06-cv-06949-PSG-SS, dated Oct. 31, 2006.

(Continued)

*Primary Examiner*—Alan A Mathews
(74) *Attorney, Agent, or Firm*—Knobbe Martens Olson & Bear LLP

(57) ABSTRACT

A surveillance system is provided including a platform having a plurality and variety of cameras or sensors mounted thereto, and a base enclosure adapted to accommodate a power supply, a variety of electronics and other equipment for controlling and providing power to the surveillance equipment. The base is constructed to be tamper resistant and immovable by manual means. A substantially hollow support pole includes a lower portion detachably mounted to the base, and an upper portion mounted to the platform. Wires and cables for connecting the surveillance equipment with the electronics and power supply are run through the support pole. Power to the system may be supplied through existing power sources, for example a 120V power source. A current breaker secured in an environmentally protected housing on the exterior of the surveillance system connected to the power supply and the electronics and surveillance equipment.

43 Claims, 14 Drawing Sheets

U.S. PATENT DOCUMENTS

| | | | |
|---|---|---|---|
| D211,166 S | 5/1968 | Pelsue | |
| D217,396 S | 4/1970 | Gentile | |
| D219,207 S | 11/1970 | Holtkamp | |
| 3,964,458 A | 6/1976 | Strauss et al. | |
| 4,005,873 A | 2/1977 | Jacobsen et al. | |
| 4,112,818 A * | 9/1978 | Garehime, Jr. | 89/41.05 |
| 4,347,590 A | 8/1982 | Heger et al. | |
| 4,474,439 A | 10/1984 | Brown | |
| 4,511,174 A | 4/1985 | Walker | |
| 4,511,886 A | 4/1985 | Rodriguez | |
| 4,580,377 A | 4/1986 | Sundin | |
| 4,657,112 A | 4/1987 | Ream et al. | |
| 4,709,265 A | 11/1987 | Silverman et al. | |
| 4,916,594 A * | 4/1990 | Headley | 362/108 |
| 4,959,798 A | 9/1990 | Gordon et al. | |
| 4,968,089 A | 11/1990 | Murai et al. | |
| 5,065,089 A | 11/1991 | Rich | |
| 5,068,773 A * | 11/1991 | Toth | 362/386 |
| 5,073,824 A * | 12/1991 | Vertin | 348/211.2 |
| 5,101,215 A | 3/1992 | Creaser, Jr. | |
| 5,108,122 A | 4/1992 | Beagley | |
| 5,115,606 A | 5/1992 | Renegar et al. | |
| D340,681 S | 10/1993 | Apiser et al. | |
| 5,383,698 A | 1/1995 | Buchholz | |
| 5,434,614 A | 7/1995 | Dainty | |
| 5,448,320 A | 9/1995 | Sakai et al. | |
| 5,518,262 A | 5/1996 | Hutchinson et al. | |
| 5,524,398 A | 6/1996 | Miller et al. | |
| 5,537,125 A | 7/1996 | Harrell, Jr. et al. | |
| 5,554,984 A * | 9/1996 | Shigenaga et al. | 340/937 |
| 5,557,892 A | 9/1996 | Lavin | |
| 5,604,551 A * | 2/1997 | Choi et al. | 396/58 |
| 5,615,855 A | 4/1997 | Marue et al. | |
| 5,624,046 A | 4/1997 | Zimmermann | |
| 5,650,821 A | 7/1997 | Hewlett | |
| 5,737,657 A | 4/1998 | Paddock et al. | |
| 5,757,286 A * | 5/1998 | Jonsson et al. | 340/937 |
| 5,767,905 A | 6/1998 | Archambo | |
| 5,786,854 A | 7/1998 | Slade et al. | |
| 5,819,124 A | 10/1998 | Somner et al. | |
| 5,873,919 A | 2/1999 | Vross et al. | |
| D408,333 S | 4/1999 | Prusmack | |
| 5,898,381 A * | 4/1999 | Gartner et al. | 340/815.65 |
| 5,944,413 A | 8/1999 | Crookham et al. | |
| 5,982,418 A * | 11/1999 | Ely | 348/153 |
| 5,986,576 A * | 11/1999 | Armstrong | 340/908 |
| 5,990,938 A * | 11/1999 | Bern | 348/152 |
| 6,041,558 A | 3/2000 | Sylvestre | |
| 6,108,985 A | 8/2000 | Paschke et al. | |
| 6,175,343 B1 * | 1/2001 | Mitchell et al. | 345/8 |
| 6,241,749 B1 | 6/2001 | Rayhanabad | |
| 6,285,197 B2 | 9/2001 | Walker | |
| 6,290,023 B1 | 9/2001 | Martin | |
| 6,292,213 B1 * | 9/2001 | Jones | 348/61 |
| 6,345,853 B1 | 2/2002 | Price, Jr. et al. | |
| 6,375,370 B1 * | 4/2002 | Wesselink et al. | 396/427 |
| 6,585,428 B1 | 7/2003 | Wesselink et al. | |
| 6,697,103 B1 * | 2/2004 | Fernandez et al. | 348/143 |
| 6,709,171 B2 | 3/2004 | Wesselink et al. | |
| 6,709,172 B2 * | 3/2004 | Brown | 396/427 |
| 6,853,302 B2 | 2/2005 | Monroe | |
| 7,059,783 B1 | 6/2006 | Wesselink et al. | |
| 7,111,997 B2 | 9/2006 | Wesselink et al. | |
| 2002/0097322 A1 | 7/2002 | Monroe et al. | |
| 2003/0093430 A1 | 5/2003 | Mottur | |
| 2005/0226610 A1 | 10/2005 | Brown | |

OTHER PUBLICATIONS

Complaint for Patent Infringement of US. Patent Nos. 7,059,783 and 7,111,997; Demand for Jury Trial, dated Oct. 31, 2006.

U.S. District Court, Central District of California Civil Cover Sheet dated Oct. 31, 2006.

U.S. District Court, Central District of California Certification and Notice of Interested Parties (Local Rule 7.1-1) for Case No. CV06-6949 R(SSx) dated Oct. 31, 2006.

Report on the Filing or Determination of an Action Regarding a Patent or Trademark for Case No. CV06-6949 R(SSx) dated Oct. 31, 2006.

Answer to Complaint by Defendant Smart Systems Technologies, Inc., Affirmative Defenses to Complaint by Smart Systems Technologies, Inc. for Case No. CV06-6949 R(SSx), dated Dec. 4, 2006.

Joint Report of Early Meeting Pursuant to Federal Rule of Civil Procedure 26(f) for Case No. CV06-6949 R(SSx), dated Jan. 10, 2007.

U.S. District Court, Central District of California Civil Minutes—General for Case No. CV06-6949 PSG(SSx), dated Apr. 16, 2007.

Defendant Smart Systems Technologies, Inc., Response to Cam Guard's First Set of Interrogatories for Case No. CV06-6949 R(SSx) dated May 7, 2007.

Defendant Smart Systems Technologies, Inc., Response to Cam Guard's Second Set of Interrogatories (Nos. 11-16) for Case No. CV06-6949 R(SSx) dated Jul. 31, 2007.

Deposition Transcript of John Curran on Behalf of Plaintiff Cam Guard Systems, Inc. taken on Aug. 8, 2007 for Case No. CV06-6949 R(SSx).

U.S. District Court, Central District of California (Southern Division—Santa Ana) Civil Docket for Case #: 8:07-cv-01051-PSG-SS as of Nov. 28, 2007.

U.S. District Court, Central District of California Civil Cover Sheet dated Sep. 11, 2007.

Complaint for Patent Infringement of U.S. Patent Nos. 7,267,496; Demand for Jury Trial, dated Sep. 11, 2007.

U.S. District Court, Central District of California Certification and Notice of Interested Parties (Local Rule 7.1-1) for Case No. SACV07-1051 AHS (RNBx) dated Sep. 11, 2007.

Report on the Filing or Determination of an Action Regarding a Patent or Trademark for Case No. SACV07-1051 AHS (RNBx) dated Sep. 11, 2007.

Answer to Complaint by Defendant Smart Systems Technologies, Inc., Affirmative Defenses to Complaint by Smart Systems Technologies, Inc. for Case No. SACV07-1051 AHS (RNx) dated Oct. 2, 2007.

U.S. District Court, Central District of California Certification and Notice of Interested Parties (Local Rule 7.1-1) for Case No. SACV07-1051 AHS (RNx) dated Oct. 3, 2007.

U.S. District Court, Central District of California Civil Minutes—General for Case No. SACV07-1051 PSG(SSx), In Chambers Re: Case Transferred to Judge Gutierrez dated Nov. 15, 2007.

Plaintiff Cam Guard Systems, Inc.'s Notice of Motion for Summary Judgement of Infringement, No Invalidity and No Unenforceability of U.S. Patent Nos. 7,059,783 and 7,111,997 filed in Case No. CV06-6949 PSG (SSx) on Nov. 26, 2007.

Declaration of Curtis R. Huffmire in Support of Plaintiff Cam Guard Systems, Inc.'s Motion for Summary Judgement of Infringement, No Invalidity and No Unenforceability of U.S. Patent Nos. 7,059,783 and 7,111,997 filed in Case No. CV06-6949 PSG (SSx) on Nov. 26, 2007.

Statement of Uncontroverted Facts and Conclusions of Law in Support of Plaintiff Cam Guard Systems, Inc.'s Motion for Summary Judgment of Infringement, No Invalidity and No Unenforceability of U.S. Patent Nos. 7,059,783 and 7,111,997 filed in Case No. CV06-6949 PSG (SSx) on Nov. 26, 2007.

Memorandum of Points and Authorities in Support of Motion for Summary Judgement of Infringement, No Invalidity and No Unenforceability of U.S. Patent Nos. 7,059,783 and 7,111,997 filed in Case No. CV06-6949 PSG (SSx) on Nov. 26, 2007.

Defendant Smart Systems Technologies, Inc., Supplemental Response to Cam Guard's First Set of Interrogatories (Nos. 1-10) for Case No. CV06-6949 R(SSx) dated Nov. 30, 2007.

Defendant Smart Systems Technologies, Inc., Supplement to Initial Disclosure [FRCP 26] for Case No. CV06-6949 R(SSx) dated Nov. 30, 2007.

Statement of Genuine Issues of Defendant Smart Systems Technologies, Inc. in Opposition to Plaintiff Cam Guard Systems, Inc.'s Motion for Summary Judgement filed in Case No. CV06-6949 PSG (SSx) on Dec. 3, 2007.

Defendant's Request for Judicial Notice in Support of its Opposition to Plaintiff's Motion for Summary Judgement Filed Concurrently Herewith in Case No. CV06-6949 PSG (SSx) on Dec. 3, 2007.

Declaration of Gus Drulias in Support of Defendant's Opposition to Plaintiff's Motion for Summary Judgment of Infringement, No Invalidity and No Unenforceability of U.S. Patent Nos. 7,059,783 and 7,111,997 filed in Case No. CV06-6949 PSG (SSx) on Dec. 3, 2007.

Declaration of John Curran in Support of Defendant Smart Systems Technologies, Inc.'s Opposition to Plaintiff Cam Guard Systems, Inc.'s Motion for Summary Judgment filed in Case No. CV06-6949 PSG (SSx) on Dec. 3, 2007.

Declaration of Mark W. Houston in Support of Defendant's Opposition to Plaintiff's Motion for Summary Judgement Filed Concurrently Herewith in Case No. CV06-6949 PSG (SSx) on Dec. 3, 2007.

Defendant's Memorandum of Points and Authorities in Opposition to Plaintiff's Motion for Summary Judgment of Infringement, No Invalidity and No Unenforceability of U.S. Patent Nos. 7,059,783 and 7,111,997 filed in Case No. CV06-6949 PSG (SSx) on Dec. 3, 2007.

Plaintiff Cam Guard Systems, Inc.'s Reply Memorandum in Support of its Motion for Summary Judgement of Infringement, No Invalidity and No Unenforceability of U.S. Patent Nos. 7,059,783 and 7,111,997 filed in Case No. CV06-6949 PSG (SSx) on Dec. 10, 2007.

Defendant Smart Systems Technologies, Inc., Second Supplement to Initial Disclosure [FRCP 26] for Case No. CV06-6949 R(SSx) dated Dec. 17, 2007.

Joint Witness List filed in Case No. CV06-6949 PSG (SSx) on Dec. 17, 2007.

Plaintiff Cam Guard Systems, Inc.'s Memorandum of Contentions of Fact and Law filed in Case No. CV06-6949 PSG (SSx) on Dec. 17, 2007.

Defendant Smart Systems Technologies, Inc.'s Memorandum of Contentions of Fact and Law filed in Case No. CV06-6949 PSG (SSx) on Dec. 17, 2007.

U.S. District Court, Central District of California Civil Minutes—General for Case No. CV06-6949 PSG(SSx), Order on Defendant Smart System Technologies, Inc.'s Motion for Partial Summary Judgement re: Limitations of Damages; Plaintiff Cam Guard Systems, Inc.'s Motion for Summary Judgment re: Infringement, No Invalidity, and Enforceability of Patents dated Dec. 18, 2007.

Notice of Lodging Joint [proposed] Pretrial Conference Order for Case No. CV06-6949 PSG (SSx) filed Jan. 7, 2008.

Smart Systems Technologies, Inc.'s Opening Memorandum Regarding Construction of Claim Terms in U.S. Patent No. 7,059,783 filed in Case No. CV06-6949 PSG (SSx) on Jan. 7, 2008.

Plaintiff Cam Guard Systems Inc.'s Memorandum of Points and Authorities Re: Claim Construction filed in Case No. CV06-6949 PSG (SSx) on Jan. 7, 2008.

Declaration of Curtis R. Huffmire in Support of Plaintiff Cam Guard Systems, Inc.'s Memorandum of Points and Authorities Re: Claim Construction filed in Case No. CV06-6949 PSG (SSx) on Jan. 7, 2008.

U.S. District Court, Central District of California Civil Minutes—General for Case No. CV07-1051 PSG(SSx), Re: Final Pretrial Conference, dated Jan. 14, 2008.

U.S. District Court, Central District of California (Southern Division) Civil Docket for Case #: 8:07-cv-01051-PSG-SS as of Jan. 17, 2008.

U.S. District Court, Central District of California (Western Division) Civil Docket for Case #: 2:06-cv-6949-PSG-SS as of Jan. 17, 2008.

Plaintiff Cam Guard Systems, Inc.'s Memorandum of Points and Authorities Re: Claim Construction of U.S. Patent No. 7,267,496, filed in Case No. CV07-1051 PSG(SSx) on Feb. 15, 2008.

Declaration of Curtis R. Huffmire in Support of Plaintiff Cam Guard Systems, Inc.'s Memorandum of Points and Authorities Re: Claim Construction of U.S. Patent No. 7,267,496, filed in Case No. CV07-1051 PSG(SSx) on Feb. 15, 2008.

Smart Systems Technologies, Inc.'s Opening Memorandum of Points and Authorities Regarding Construction of Claim Terms in U.S. Patent No. 7,267,496, filed in Case No. CV07-1051 PSG(SSx) on Feb. 15, 2008.

Declaration of Mark W. Huston in Support of Smart Systems Technologies, Inc.'s Opening Memorandum of Points and Authorities Regarding Construction of Claim Terms in U.S. Patent No. 7,267,496, filed in Case No. CV07-1051 PSG(SSx) on Feb. 15, 2008.

Smart Systems Technologies, Inc.'s Reply Memorandum Regarding Construction of Claim Terms in U.S. Patent Nos. 7,059,783, 7,111,997 and 7,267,496, filed on, filed on Feb. 29, 2008.

Declaration of John Curran in Support of Smart Systems Technologies, Inc.'s Reply Memorandum Regarding Construction of Claim Terms in U.S. Patent Nos. 7,059,783, 7,111,997 and 7,267,496, filed on, filed on Feb. 29, 2008.

Declaration of Mark W. Houston in Support of Smart Systems Technologies, Inc.'s Reply Memorandum Regarding Construction of Claim Terms in U.S. Patent Nos. 7,059,783, 7,111,997 and 7,267,496, filed on, filed on Feb. 29, 2008.

Plaintiff Cam Guard Systems, Inc.'s Reply Memorandum of Points and Authorities Re: Claim Construction, filed on Feb. 29, 2008.

Supplemental Declaration of Curtis R. Huffmire In Support of Plaintiff Cam Guard Systems, Inc.'s Reply Memorandum of Points and Authorities Re: Claim Construction, filed on Feb. 29, 2008.

Oral and Telephonic Deposition Transcript of Michael Cupulli on Behalf of Plaintiff Cam Guard Systems, Inc. taken on Mar. 4, 2008 for Case No. SACV07-1051 PSG (SSx).

Deposition Transcript of Craig Curran on Behalf of Plaintiff Cam Guard Systems, Inc. taken on Mar. 5, 2008 for Case No. SACV07-1051 PSG (SSx).

Deposition Transcript of John Curran on Behalf of Plaintiff Cam Guard Systems, Inc. taken on Mar. 6, 2008 for Case No. SACV07-1051 PSG (SSx).

U.S. District Court, Central District of California Civil Minutes—General for Case No. CV07-1051 PSG(SSx), In Chamber Orders Re: Markman Hearing/Status Conference Re: Patent 496, 783, and 997, dated Mar. 10, 2008.

U.S. District Court, Central District of California Civil Minutes—General for Case No. CV07-1051 PSG(SSx), Markman Hearing/Status Conference Re: Patent 496, 783, and 997, dated Apr. 7, 2008.

U.S. District Court, Central District of California Civil Minutes—General for Case No. CV07-1051 PSG(SSx), In Chamber Orders on Order Constuing Claims of Disputed Patents, dated Apr. 8, 2008.

Plaintiff's Notice of Motion for Summary Judgement filed in Case No. CV07-1051 PSG(SSx) on Apr. 28, 2008.

Plaintiff's Memorandum of Points and Authorities in Support of its Motion for Summary Judgement filed in Case No. CV07-1051 PSG(SSx), dated Apr. 28, 2008.

Plaintiff's Statement of Uncontroverted Facts and Conclusions of Law in Support of its Motion for Summary Judgement filed in Case No. CV07-1051 PSG(SSx), dated Apr. 28, 2008.

Declaration of Curtis R. Huffmire In Support of Plaintiff's Motion for Summary Judgement filed in Case No. CV07-1051 PSG(SSx), dated Apr. 28, 2008.

Defendant Smart Systems Technologies, Inc.'s Notice of Motion and Motion for Partial Summary Judgement of Non-Infringement of Certain Claims of U.S. Patent Nos. 7,059,783, 7,111,997 and 7,267,496, filed in Case No. CV07-1051 PSG(SSx) on Apr. 30, 2008.

Defendant Smart Systems Technologies, Inc.'s Memorandum of Points and Authorities in Support of its Motion for Partial Summary Judgement of Non-Infringement of Certain Claims of U.S. Patent Nos. 7,059,783, 7,111,997 and 7,267,496, filed in Case No. CV07-1051 PSG(SSx) on Apr. 30, 2008.

Statement of Uncontroverted Facts and Conclusions of Law in Support of Defendant Smart Systems Technologies, Inc.'s Motion for Partial Summary Judgement of Non-Infringement of Certain Claims of U.S. Patent Nos. 7,059,783, 7,111,997 and 7,267,496, filed in Case No. CV07-1051 PSG(SSx) on Apr. 30, 2008.

Declaration of Mark W. Huston in Support of Defendant's Motion for Partial Summary Judgement of Non-Infringement of Certain Claims of U.S. Patent Nos. 7,059,783, 7,111,997 and 7,267,496, filed in Case No. CV07-1051 PSG(SSx) on Apr. 30, 2008.

Declaration of John Curran in Support of Defendant's Motion for Partial Summary Judgement of Non-Infringement of Certain Claims of U.S. Patent Nos. 7,059,783, 7,111,997 and 7,267,496, filed in Case No. CV07-1051 PSG(SSx) on Apr. 30, 2008.

Defendant Smart Systems Technologies, Inc.'s Request for Judicial Notice in Support of Defendant's Motion for Partial Summary Judgement of Non-Infringement of Certain Claims of U.S. Patent Nos. 7,059,783, 7,111,997 and 7,267,496, filed in Case No. CV07-1051 PSG(SSx) on Apr. 30, 2008.

Plaintiff Cam Guard Systems, Inc.'s Notice of Motion *in Limine* No. 1 to Exclude Expert Testimony from Gus Drulias at Trial filed in Case No. CV07-1051 PSG(SSx), dated May 2, 2008.

Plaintiff Cam Guard Systems, Inc.'s Memorandum of Points and Authorities in Support of its of Motion *in Limine* No. 1 to Exclude Expert Testimony from Gus Drulias at Trial filed in Case No. CV07-1051 PSG(SSx), dated May 2, 2008.

Declaration of Curtis R. Huffmire In Support of Plaintiff Cam Guard Systems, Inc's Notice of Motion *in Limine* No. 1 to Exclude Expert Testimony from Gus Drulias at Trial filed in Case No. CV07-1051 PSG(SSx), dated May 2, 2008.

Plaintiff Cam Guard Systems, Inc's Notice of Motion *in Limine* No. 2 to Exclude Evidence Relating to Inequitable Conduct and Indefiniteness from the Jury filed in Case No. CV07-1051 PSG(SSx), dated May 2, 2008.

Plaintiff Cam Guard Systems, Inc.'s Memorandum of Points and Authorities in Support of its of Motion *in Limine* No. 2 to Exclude Evidence Relating to Inequitable Conduct and Indefiniteness from the Jury filed in Case No. CV07-1051 PSG(SSx), dated May 2, 2008.

Notice of Manual Filing, filed in Case No. CV07-1051 PSG(SSx), dated May 5, 2008.

Defendant's Memorandum of Points and Authorities in Opposition to Plaintiff's Motion for Summary Judgment filed in Case No. CV07-1051 PSG(SSx), dated May 5, 2008.

Defendant Smart Systems Technologies, Inc.'s Separate Statement of Genuine Issues of Material Fact in Opposition to Plaintiff Cam Guard Systems, Inc.'s Motion for Summary Judgment filed in Case No. CV07-1051 PSG(SSx), dated May 5, 2008.

Declaration of Mark W. Houston in Support of Defendant's Opposition to Plaintiff's Motion for Summary Judgment filed in Case No. CV07-1051 PSG(SSx), dated May 5, 2008.

Declaration of John Curran in Support of Defendant's Opposition to Plaintiff's Motion for Summary Judgment filed in Case No. CV07-1051 PSG(SSx), dated May 5, 2008.

Declaration of Gus S. Drulias in Support of Defendant's Opposition to Plaintiff's Motion for Summary Judgment filed in Case No. CV07-1051 PSG(SSx), dated May 5, 2008.

Defendant Smart Systems Technologies, Inc.'s Request for Judicial Notice in Support of Defendant's Opposition to Plaintiff's Motion for Summary Judgment filed in Case No. CV07-1051 PSG(SSx), dated May 5, 2008.

Defendant Smart Systems Technologies, Inc.'s Memorandum of Contentions of Fact and Law filed in Case No. CV07-1051 PSG(SSx), dated May 12, 2008.

Plaintiff's Reply Memorandum of Points and Authorities in Support of its Motion for Summary Judgment filed in Case No. CV07-1051 PSG(SSx), dated May 12, 2008.

Plaintiff Cam Guard Systems, Inc.'s Memorandum of Contentions of Fact and Law filed in Case No. CV07-1051 PSG(SSx), dated May 12, 2008.

U.S. District Court, Central District of California Civil Minutes—General for Case No. CV07-1051 PSG(SSx), In Chamber Orders Re: Order Continuing Plaintiff's Motion for Summary Judgment—Filed Apr. 28, 2008 (Doc 30), dated May 15, 2008.

Plaintiff Cam Guard Systems, Inc.'s Notice of Motion *in Limine* No. 3 to Exclude Recently-Identified Witnesses and Documents filed in Case No. CV07-1051 PSG(SSx), dated May 16, 2008.

Plaintiff Cam Guard Systems, Inc.'s Memorandum of Points and Authorities in Support of its Motion *in Limine* No. 3 to Exclude Recently-Identified Witnesses and Documents filed in Case No. CV07-1051 PSG(SSx), dated May 16, 2008.

Plaintiff Cam Guard Systems, Inc.'s Notice of Motion *in Limine* No. 4 to Exclude Uncorroborated Oral Testimony of Prior Art Documents filed in Case No. CV07-1051 PSG(SSx), dated May 16, 2008.

Plaintiff Cam Guard Systems, Inc.'s Memorandum of Points and Authorities in Support of its of Motion *in Limine* No. 4 to Exclude Uncorroborated Oral Testimony of Prior Art Documents filed in Case No. CV07-1051 PSG(SSx), dated May 16, 2008.

Supplemental Declaration of Curtis R. Huffmire In Support of Plaintiff Cam Guard Systems, Inc.'s Motion *in Limine* Nos. 3 and 4 filed in Case No. CV07-1051 PSG(SSx), dated May 16, 2008.

Plaintiff Cam Guard Systems, Inc's Memorandum of Points and Authorities in Opposition to Defendant Smart Systems Technologies, Inc.'s Motion for Partial Summary Judgement in Case No. CV07-1051 PSG(SSx), dated May 19, 2008.

Plaintiff Cam Guard Systems, Inc.'s Statement of Genuine Issues of Material Fact in Opposition to Defendant Smart Systems Technologies, Inc.'s Motion for Partial Summary Judgement of Non-infringement of Certain Claims of U.S. Patent Nos. 7,059,783, 7,111,997 and 7,267,496, filed in Case No. CV07-1051 PSG(SSx), dated May 19, 2008.

Declaration of Judy L. Gibb in Support of Plaintiff Cam Guard Systems, Inc.'s Opposition to Defendant Smart Systems Technologies, Inc.'s Motion for Partial Summary Judgement, filed in Case No. CV07-1051 PSG(SSx), dated May 19, 2008.

Declaration of Curtis R. Huffmire in Support of Plaintiff Cam Guard Systems, Inc.'s Opposition to Defendant Smart Systems Technologies, Inc.'s Motion for Partial Summary Judgment, filed in Case No. CV07-1051 PSG(SSx), dated May 19, 2008.

Reply of Defendant Smart Systems Technologies, Inc. to Plaintiff's Opposition to Defendant's Motion for Partial Summary Judgement Non-Infringement of Certain Claims of U.S. Patent Nos. 7,059,783, 7,111,997 and 7,267,496, filed in Case No. CV07-1051 PSG(SSx), dated May 23, 2008.

Defendant Smart Systems Technologies, Inc.'s Memorandum of Points and Authorities in Opposition to Plaintiff's Motion *in Limine* No. 1, filed in Case No. CV07-1051 PSG(SSx), dated May 23, 2008.

Declaration of Mark W. Huston in Support of Defendant Smart Systems Technologies, Inc.'s Opposition to Plaintiff's Motion *in Limine* No. 1, filed in Case No. CV07-1051 PSG(SSx), dated May 23, 2008.

Defendant Smart Systems Technologies, Inc.'s Memorandum of Points and Authorities in Opposition to Plaintiff's Motion *in Limine* No. 2, filed in Case No. CV07-1051 PSG(SSx), dated May 23, 2008.

Defendant Smart Systems Technologies, Inc.'s Memorandum of Points and Authorities in Opposition to Plaintiff's Motion *in Limine* No. 3, filed in Case No. CV07-1051 PSG(SSx), dated May 23, 2008.

Declaration of Mark W. Huston in Support of Defendant Smart Systems Technologies, Inc.'s Opposition to Plaintiff's Motion *in Limine* No. 3, filed in Case No. CV07-1051 PSG(SSx), dated May 23, 2008.

Defendant Smart Systems Technologies, Inc.'s Memorandum of Points and Authorities in Opposition to Plaintiff's Motion *in Limine* No. 4, filed in Case No. CV07-1051 PSG(SSx), dated May 23, 2008.

Notice of Lodging Joint [Proposed] Pretrial Conference Order, filed in Case No. CV07-1051 PSG(SSx), dated May 23, 2008.

U.S. District Court, Central District of California Civil Minutes—General for Case No. CV07-1051 PSG(SSx), In Chamber Orders on Defendant Smart Systems Technologies, Inc.'s Notice of Motion for Partial Summary of Non-infringement of Certain Claims of U.S. Patent Nos. 7,059,783, 7,111,997 and 7,267,496—Filed Apr. 30, 2008 (Doc 85); Plaintiff's Motion for Summary Judgement—Filed Apr. 28, 2008 (Doc. 30), dated Jun. 2, 2008.

U.S. District Court, Central District of California Civil Minutes—General for Case No. CV07-1051 PSG(SSx), In Chamber Orders on (1) Plaintiff's Motion for Summary Judgment on Infringement, Invalidity and Unenforceability and (2) Defendant's Motion for Summary Judgment on Infringement, dated Jun. 3, 2008.

Plaintiff Cam Guard Systems, Inc.'s Reply Memorandum in Support of its Motion *in Limine* No. 1, filed in Case No. CV07-1051 PSG(SSx), dated Jun. 3, 2008.

Plaintiff Cam Guard Systems, Inc.'s Reply Memorandum in Support of its Motion *in Limine* No. 2, filed in Case No. CV07-1051 PSG(SSx), dated Jun. 3, 2008.

Plaintiff Cam Guard Systems, Inc.'s Reply Memorandum in Support of its Motion *in Limine* No. 3, filed in Case No. CV07-1051 PSG(SSx), dated Jun. 3, 2008.

Plaintiff Cam Guard Systems, Inc.'s Reply Memorandum in Support of its Motion *in Limine* No. 4, filed in Case No. CV07-1051 PSG(SSx), dated Jun. 3, 2008.

Plaintiff Cam Guard Systems, Inc.'s Amended Memorandum of Contentions of Fact and Law filed in Case No. CV07-1051 PSG(SSx), dated Jun. 6, 2008.

Notice of Lodging Joint [Proposed] Pretrial Conference Order filed in Case No. CV07-1051 PSG(SSx), dated Jun. 6, 2008.

Amended Joint Wireless List filed in Case No. CV07-1051 PSG(SSx), dated Jun. 6, 2008.

SST's Memorandum of Contentions of Fact and Law filed in Case No. CV07-1051 PSG(SSx), dated Jun. 6, 2008.

U.S. District Court, Central District of California Civil Minutes—General for Case No. CV07-1051 PSG(SSx), Final Pretrial Conference, dated Jun. 9, 2008.

Joint Stipulation to Continue Pretrial Date and Set Briefing Schedule for Motion for Permanent Injunction, filed in Case No. CV07-1051 PSG(SSx), dated Jun. 12, 2008.

Order Granting Joint Stipulation to Continue Pretrial Date and Set Briefing Schedule for Motion for Permanent Injunction, filed in Case No. CV07-1051 PSG(SSx), dated Jun. 13, 2008.

U.S. District Court, Central District of California (Southern Division) Civil Docket for Case #: 8:07-cv-01051-PSG-SS as of Jun. 23, 2008.

U.S. District Court, Central District of California (Western Division) Civil Docket for Case #: 2:06-cv-6949-PSG-SS as of Jun. 23, 2008.

\* cited by examiner

TEMPORARY SURVEILLANCE SYSTEM

This is a continuation-in-part of U.S. patent application Ser. No. 10/128,589, filed Apr. 23, 2002, now U.S. Pat. No. 6,709,172 which is a continuation-in-part of U.S. patent application Ser. No. 09/502,028, filed on Feb. 10, 2000 (issued as U.S. Pat. No. 6,375,370 on Apr. 23, 2002), and is a continuation in part of PCT/US01/04533 filed Feb. 12, 2001, and is a continuation in part of U.S. patent application Ser. No. 09/958,706, filed on Feb. 7, 2002 (issued as U.S. Pat. No. 6,585,428 on Jul. 1, 2003), and a continuation in part of U.S. application Ser. No. 10/127,017, filed on Apr. 19, 2002, now U.S. Pat. No. 6,709,171 which is a continuation of U.S. patent application Ser. No. 09/502,028, filed on Feb. 10, 2000 (issued as U.S. Pat. No. 6,375,370 on Apr. 23, 2002), and is a continuation in part of U.S. patent application Ser. No. 09/958,706, filed on Feb. 7, 2002 (issued as U.S. Pat. No. 6,585,428 on Jul. 1, 2003), which is a 371 of PCT/US01/04533 Feb. 12, 2001, which is a continuation in part of U.S. patent application Ser. No. 09/502,028, filed on Feb. 10, 2000 (issued as U.S. Pat. No. 6,375,370 on Apr. 23, 2002).

FIELD OF THE INVENTION

The present invention relates to surveillance systems and more specifically relates to a temporary surveillance and security system.

BACKGROUND OF THE INVENTION

Surveillance systems for monitoring remote installations are well known, and typically include on-site surveillance equipment, such as video cameras, microphones, infrared sensors and the like, positioned at various locations, to capture electronic data and information, as well as visual images of the site. These conventional systems often utilize a central monitor station for receiving and processing the electronic data from multiple remote installations. Such surveillance systems require a structure on which the camera or other device may be securely mounted at a desirable elevation. The structure may be a wall of a facility, for example.

On a building construction site, for example a site where an apartment building is under construction, such conventional surveillance systems are less than adequate, as the apartment building itself may be the target of theft or vandalism. The nature of the building under construction lends itself to being climbed by persons intent on vandalism, and the camera used for surveillance can be easily tampered with or destroyed, leaving the construction site virtually unguarded. Theft and arson are not uncommon at such sites, and therefor security guards may be hired to watch the site during off-hours. As can be appreciated, such a solution to vandalism problems is costly and may not be as reliable as an unmanned, mechanical surveillance system.

SUMMARY OF THE INVENTION

The present invention provides a surveillance system which is especially advantageous for temporary use where a conventional surveillance system would be undesirable, such as at a construction site, outdoor concert event, or political rally. The system is transportable to the site in separate portions and then assembled on the site. Once assembled, the system is effectively indestructible, tamper-proof and highly reliable to use. Advantageously, once the system is no longer needed, it can be disassembled and used again in another location.

Accordingly, a temporary surveillance system is provided by the present invention which overcomes the inadequacies of conventional systems. The system is easily assembled at an area to be surveyed. The system is highly versatile for accommodating a number of different applications for example, for daytime and/or evening monitoring of construction sites, outdoor concert events, political rallies, or any other location or event which could benefit from ongoing surveillance.

Importantly, the system is designed to be easily assembled at a site, and effectively tamper-proof once assembled.

The present surveillance system in accordance with the present invention generally comprises a surveillance assembly, including a platform or one or more support brackets adapted to support surveillance equipment, for example cameras, lights, motion detectors, microphones and a base, including a substantially hollow enclosure adapted to accommodate a power supply and electronics equipment for controlling the surveillance equipment.

The system further includes a support pole, including a lower portion detachably mounted to the base, and an upper portion detachably mounted to the surveillance assembly platform. Applicable wires and cables for connecting the electronics equipment and the surveillance equipment are provided through conduit aligned along or within the support pole. For example, the support pole may be substantially hollow and when disposed through the base may provide an inlet for running wires and cables from the base enclosure through the pole and into the surveillance assembly. The support pole preferably has an inner diameter of a suitable size to accommodate wires and cables and conduit, which optionally may include for example PVC conduit isolating any communication cables from electrical wires/cables. The support pole may be comprised of a unitary structure of up to about 25 feet or more, or may be comprises of a plurality of separate telescoping segments. The support pole may be a unitary structure, such as a 21-foot long hollow pole.

The base can comprise a heavy concrete structure weighing, for example, at least about 1500 pounds, sufficient to prevent the base from being manually displaced. However, lighter or heavier bases, such as 1,000-pound or 5,000-pound bases, can be employed. The concrete structure may include a steel door frame and steel recessed doors resistant to prying or breaking.

The electronics equipment and surveillance equipment may be connected to a power source by hardwiring or quick connect plugs and receptacles. The power source may be an existing 120V or 220V commercial power source. Preferably, the surveillance assembly further includes a power distribution box, mounted in a water tight enclosure to the upper portion of the support pole, the power distribution box being adapted to receive and distribute electrical power from the power source to the surveillance equipment.

In a preferred embodiment, a circuit box or distribution box including a receptacle for connecting to an existing power supply is provided and is advantageously housed within the enclosure. However, the circuit box or distribution box can be mounted on or housed elsewhere in the surveillance system, such as on the platform, mast, or on the base. The circuit box preferably includes a plurality of receptacles for accommodating equipment plugs. A power supply may be included within the base enclosure for providing electrical power to the electronic equipment. If power supply is provided, it is preferably enclosed within the concrete base enclosure. The power supply may be electrically connected to an existing power source through wires disposed through the center of the base. Batteries, generators, solar collectors or other suitable means for providing alternative sources of power may also be provided. These alternative power sources may be enclosed within the base enclosure or may be attached to the platform.

In another preferred embodiment, the power distribution box is mounted at the top of the mast or support pole near the platform. External power is provided through a power supply line to supply electrical power to the system. The power supply line is connected to the power distribution box. The power from the power distribution box is supplied to a current breaker, such as a circuit breaker or fuse box, or G.F.I. or ground fault breaker, preferably located within the hollow enclosure of the base. Electrical power is distributed from the current breaker to the surveillance equipment and electronics. The surveillance equipment and electronics comprising digital recorders, timers, amplifiers, wireless transmitters/receivers, video recorders, motion detectors, backup power supply, lighting equipment, flood lights, spotlights, infrared light sources, and the like. The current breaker can also be located on the platform, on the support pole, or on, or preferably, within the base. The power distribution box can mounted at the top of the support pole near the platform, and a power supply line from an external source to supply electrical power can be connected to the power distribution box. A power line from the power distribution box mounted on the support pole at the top or on the platform can descend through the hollow interior of the support pole to the current breaker within the hollow of the base. The circuit breaker is connected to or has a power outlet panel for distribution of power to the electronics equipment and surveillance equipment. Alternatively, the power distribution box at the top of the support pole or on the platform can have a current breaker and power can be distributed from the current breaker to the lighting equipment and surveillance equipment on the platform and on top of the support pole. A power line from the distribution box can descend through the support pole to a second circuit breaker within the hollow of the base. Electrical power is distributed from the second current breaker to the surveillance equipment and electronics in the hollow of the base.

The system may further comprise vent means for facilitating passage of air through the system in order to cool the electronic equipment enclosed in the base. For example, the vent means may include an air inlet within the upper portion of the support pole and a fan within the base enclosure, for drawing ambient, cool air though the air inlet through the pole and into the enclosure and for forcing relatively warmer air out of the base enclosure. Venting is normally not necessary because the concrete base normally keeps the hollow enclosure cool enough for operations even in desert areas of the West.

The surveillance equipment may comprise many different pieces of equipment, depending on the application desired. The surveillance equipment may comprise a plurality of cameras, for example video cameras, digital cameras, time lapse, digital, still photography cameras, and/or infrared sensors. The platform or supporting brackets may be sized and adapted to support any number of cameras or sensors, between one and up to about 250 pieces of equipment. The surveillance equipment may comprise a multiplexor, which may be a four camera multiplexor, an 8 camera multiplexor or a 16 camera multiplexor. The surveillance equipment may be permanently secured to the platform or may be removable. Other surveillance equipment may be alternatively or additionally be provided, for example, pan and tilt devices, zoom cameras, lights, transmission/receiver devices, motion detectors, light sensors, satellite transmission devices, and cell phone applications, and computer devices, directional microphones and sound detectors.

In an alternate embodiment, of the present invention, the base can comprise a heavy, solid concrete block, a heavy metal plate structure, a metal or plastic reinforced tank capable of holding water and/or sand, or a reinforced frame with a bladder capable of holding water and/or sand. Such bases have means for permanently or detachably securing the pole. A secured metal container or box for holding, protecting and securing the power supply and electronic equipment for the surveillance equipment can be permanently or detachably secured to the pole and/or the alternative bases.

In one advantageous embodiment of the present invention, the surveillance system further comprises means for facilitating transport of the system by vehicle. More particularly, the system includes a trailer that is both sized and adapted to support and accommodate the concrete base. For example, the trailer may be a wheeled trailer comprising a saddle having a floor portion, and at least three sidewalls. The trailer is sized to cradle the base, and includes means, for example a hitch, for enabling the trailer to be towed by a motor vehicle. Trailers may also be sized to transport two or more surveillance systems.

Preferably, the trailer includes means for facilitating loading and unloading of the base from the trailer. For example, a rotatable gate may be provided, which would both function to secure the base in the trailer during transport and, upon downward rotation of the gate, as a sturdy ramp element. The floor and/or ramp may be provided with rollers to ease the movement of the base. It will be appreciated that such a trailer preferably may include, or be adapted to include appropriate signal, stop and brake lights and any other equipment and/or necessary features for ensuring legal travel along public roadways.

Moreover, with the trailer feature, the entire surveillance system may be transported substantially intact. For example, a lower portion of the support pole may be permanently mounted to the base, thereby further reducing any chance of vandalism or theft of the pole mounted cameras or other equipment. As described briefly hereinabove, the pole may be comprised of a telescoping configuration, or may include detachable segments that can be assembled for use and disassembled for transportation and/or storage. One feature of the invention includes a fixed length support pole, which may be irremovably mounted to the base. Means for enabling an upper portion of the pole to be rotated with respect to the fixed, base-mounted lower portion are provided. Thus, during travel, the base is cradled in an upright position in the trailer, and the upper portion of the support pole is rotated, for example, toward a rear of the trailer, thereby reducing the effective vehicle height. Preferably, a support bar is provided for stabilizing the upper pole portion during travel. In addition still, a trailer mounted winch mechanism may be provided for facilitate raising and lowering of the upper portion of the support pole and for stabilizing the base during loading and unloading from the trailer.

BRIEF DESCRIPTION OF THE DRAWINGS

The features and advantages of the present invention will be more clearly understood and appreciated with reference to the following detailed description when considered in conjunction with the accompanying drawings of which.

DETAILED DESCRIPTION OF THE PREFERRED EMBODIMENTS

Figure 1:
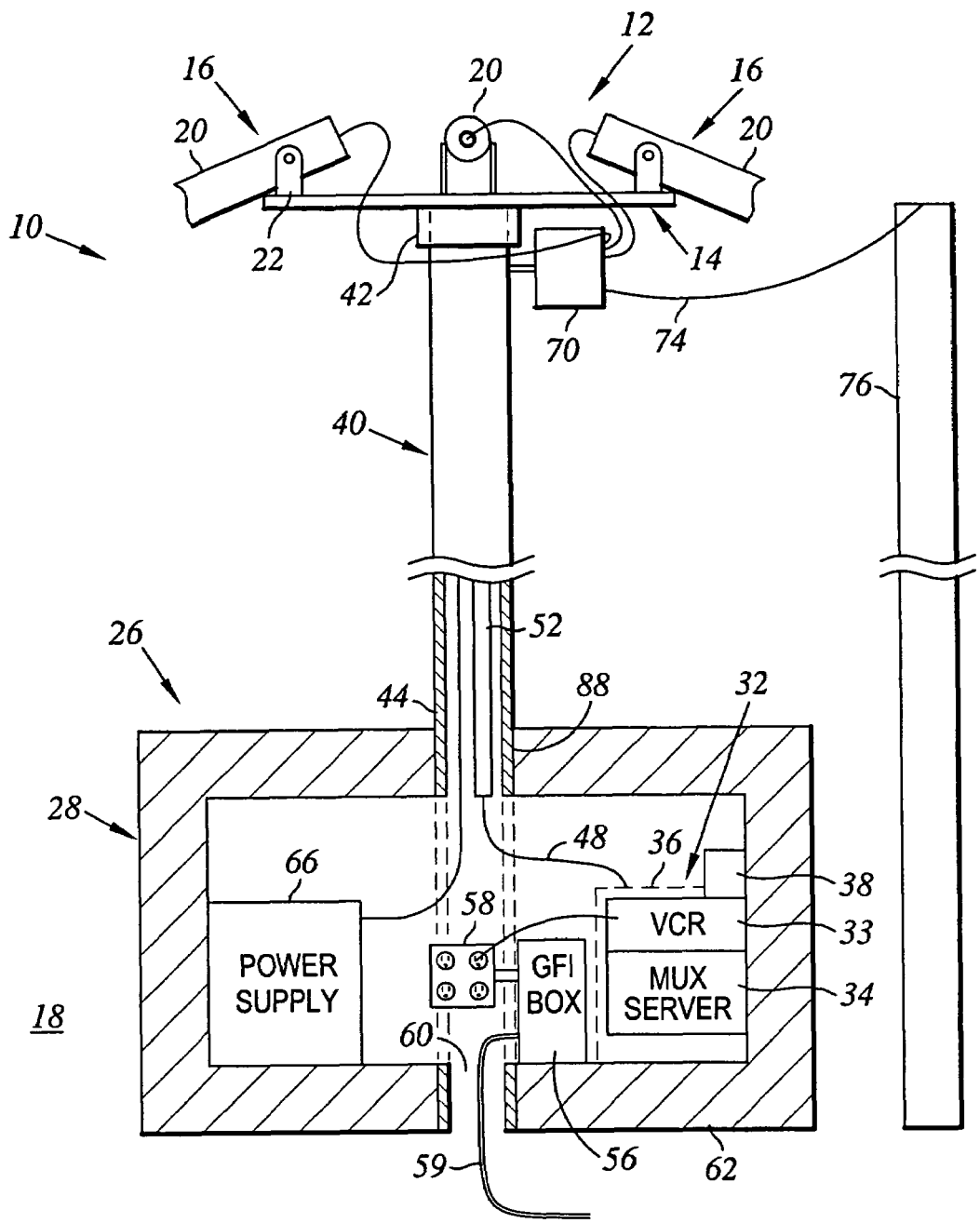
FIG. 1 shows a diagram of an embodiment of a surveillance system in accordance with the present invention, including a heavy, immovable concrete base adapted to contain electronics equipment and a power supply, a support pole, a platform supporting a plurality of surveillance cameras and other surveillance equipment, and cables and wires running at least partially through the support pole to provide electrical and communications connection between the electronics equipment and power supply and the surveillance equipment.

Turning now to FIG. 1, a surveillance system in accordance with the present invention is shown generally at 10. The system generally comprises a surveillance assembly 12, including a platform 14 adapted to support surveillance equipment 16 for providing observations of an area 18 (FIG. 21) in a vicinity of the surveillance system 10.

The surveillance equipment 16 may include any number and type of device 16 suitable for providing observations of objects. For the sake of simplicity, the surveillance devices 16 shown in FIG. 1 include a plurality of video and/or digital cameras 20, though it is to be appreciated that the devices may alternatively or additionally include, for example, time lapse, digital, still photography cameras, and/or infrared sensors. The platform 14 may be sized and adapted to support any number of such cameras or sensors, for example between one and up to about 250 pieces of equipment. Furthermore, the surveillance equipment 16 may comprise a multiplexor, which may be a four camera multiplexor, an 8 camera multiplexor or a 16 camera multiplexor, as are known in the art. In addition, it is contemplated that the surveillance assembly 12 may include equipment such as lights, light, sound or motion sensors, microphones, transmitting/receiving devices, satellite transmission devices, computer devices, and equipment enabling cell phone applications.

The cameras 20 are shown as secured to the platform 14 by pivotal connectors 22 and the viewing direction and/or angle of the cameras 20 may be controlled by pan and tilt devices (not shown). The platform 14 itself may be a substantially planar element made of steel or other suitable material or materials of construction. The platform may be reinforced with struts, beams, framing, and the like (not shown).

The system 10 further comprises a base 26, including a substantially hollow enclosure 28 sized and adapted to contain equipment, for example electronics equipment 32 for controlling the surveillance equipment 16, for example a video cassette recorder unit or a digital video recorder unit or a digital recorder 33, and a multiplexor server unit 34. The electronics equipment 32 may be housed within a sub-enclosure 36 made of, for example, plastic, metal, fiberglass or other suitable materials. This sub-enclosure 36 may be equipped with a cooling fan 38, blower or other apparatus to maintain a suitable temperature for effective operation of the equipment 32.

The base 26 is preferably made of concrete and has a weight sufficient to prevent the base 26 from being displaced or tipped by hand or wind. The base 26 may have outer dimensions of, for example, 4'×4'×3', and inner enclosure dimensions of 1'×2'×4'. In addition, the base may have a weight of between about 1000 pounds and about 5000 pounds, conveniently between 1500 and 3000 pounds. However, lighter and heavier bases can be employed. The base 26 is constructed to be substantially impact resistant as well, for example with respect to collision by a motor vehicle such as an automobile. Although not shown, the base 26 may include additional concrete block structures, bolted or otherwise secured to the sides of the base 26, to provide additional weight thereto as additional security against theft or tampering. The base also serves as a heat sink and insulator to protect the electronic equipment stored in the enclosure from external temperature variations.

As shown, the system 10 further comprises a support pole 40 having an upper portion 42 mounted to the surveillance assembly 12 and a lower portion 44 detachably mounted to the base 26, for example at a top center of the base 26. The pole 40 may be about 12 feet high or more and may be comprised of a single pole structure or may be comprised of multiple telescoping portions (see FIG. 14) or multiple attachable/detachable portions (see FIG. 18), or be hinged (see FIG. 12). The height of the pole desired may depend on the elevation for which the surveillance equipment will be best suited for observing a desired range of the site. A 21-foot pole had been found to be suitable. The pole 40 may be made of steel, aluminum, or the like, and preferably includes a smooth surface finish for preventing climbing thereof. The pole may also be constructed of fiber reinforced synthetic or polymeric materials, or concrete, preferably reinforced, or wood, preferably laminated.

In addition, means, such as suitable wiring 46 and cables 48 are provided for connecting the surveillance equipment 16 on the platform 14 to the electronics equipment 32 contained in the base 26 and optionally to a distribution box or to an external telephone or other communication system, and/or external power source. Wiring can also be supplied to receive external power for power supply 66 or to supply power to the surveillance equipment 16.

In a preferred embodiment, the support pole 40 is substantially hollow and is adapted to accommodate the wires 46 and cables 48 used to functionally connect the electronics 32 with the surveillance equipment 16. Preferably, separate means are provided for connecting communications cables 48 with the surveillance assembly 12, for example the communications cables 48 may be run through PVC pipe 52 or other conduit suitable for effectively separating and shielding communications cables 48 from any electrical field. Alternatively, cables, wires and conduit may be secured to an outer surface of the pole 40, preferably in a secure or armored conduit, such as a steel tube or pipe.

In one particularly advantageous embodiment of the invention, the base 28 also houses a ground fault breaker (G.F.I.) box 56 electrically connected to receptacle means which may include for example an electrical box 58 having four or more standard plug receptacles as shown for connecting to the electronics equipment 32. Conventional current breakers can be used such as ground fault breakers (G.F.I.), fuses, circuit breakers, ground fault detectors, and the like. Although the current breaker is conveniently located in the enclosure in the base to protect it from tampering and environmental conditions, such as rain, wind, dust, heat, and the like, and to make it more convenient to reach for resetting, the current breaker can be mounted at the top of the pole in its own protective box, underneath the platform or on top of the platform, again in its own protective box, or the current breaker can be attached at the point where the power supply line 74 for the surveillance system 10 is secured to the external power source. External power sources for most sites will be power lines mounted on poles, normally wooden poles. The power line 74 for the surveillance equipment 10 is normally strung from the top of the nearest pole having a power line (see FIG. 1). The current breaker can be secured at the top of the pole acting as the interface between the external power line and the power line for the surveillance equipment.

A current breaker is preferably employed, and in many communities, will be required by code. The current breaker increases the safety of the surveillance equipment or electronic equipment and minimizes the chance of shock to those who come in contact with the conductive portions of the surveillance equipment and electronic equipment and it protects the electronic equipment and the surveillance equipment, which can be very expensive items, from power surges, short circuits, and the like.

When a G.F.I. is employed, the G.F.I. box is connected to an incoming power source of 110 volts or 120 volts or to a higher voltage source. As shown, for security reasons, the G.F.I. box may be powered by a power line 59 running through an aperture 60 in a bottom portion 62 of the base enclosure 28 (see FIG. 4). The aperture 60 may be more specifically a portion of PVC conduit having a diameter of about 3 inches centered in the concrete base bottom 62. It should be appreciated that electrical power may alternatively be supplied to the G.F.I. breaker box by other standard means, for example by power sources available through power poles at construction job sites, or by means such as batteries, generators, solar collectors or the like. Battery power can be converted through converters, indenters, or other suitable means.

Preferably, electrical power is provided to the surveillance equipment 16, through a separate power supply 66, for example an uninterruptible power supply (UPS) mounted within the base enclosure 28. An external power supply, such as standard utility 120 or 240V power, preferably supplies power to the power supply 66. The power supply 66 may comprise a single power supply unit for each surveillance device 16 or may be a larger power unit for supplying power to multiple devices 16. The power supply 66 may be mounted within the enclosure 28 by for example first mounting the power supply 66 to a (plywood) board by bolts which are bolted to the enclosure 28 by nuts poured in place while the concrete base is poured during construction of the base 26.

A distribution box 70, preferably mounted to the upper portion 42 of the pole 40, is provided for distributing electrical power from an external source via power line 74 to the power supply 66, and from the power supply 66 to the various surveillance devices 16. Preferably, the distribution box 70 is water tight and/or weather resistant. The distribution box can be mounted on top of the platform, bottom of the platform, at the top of the mast, at the bottom of the mast, on the base, and the like.

As shown in FIG. 1, the distribution box 70 may alternatively be connected by line 74 to an existing power/utility pole 76 having a 110V or 120V, or 220/240V power supply source which is connected to power supply 66 by electrical wiring extending through pole 40. It is contemplated that communications devices, such as telephone devices and Internet communication lines and cables, in the surveillance system may further be connected through communications lines and cables provided or carried by such utility poles.

It is to be appreciated that there are many alternative means for functionally and electrically connecting the surveillance equipment 16 with the electronics equipment 32 and many alternative means for electrically powering these devices, as will be known to those skilled in the art. All such alternative means are considered to be within the scope of the present invention.

Figure 20:
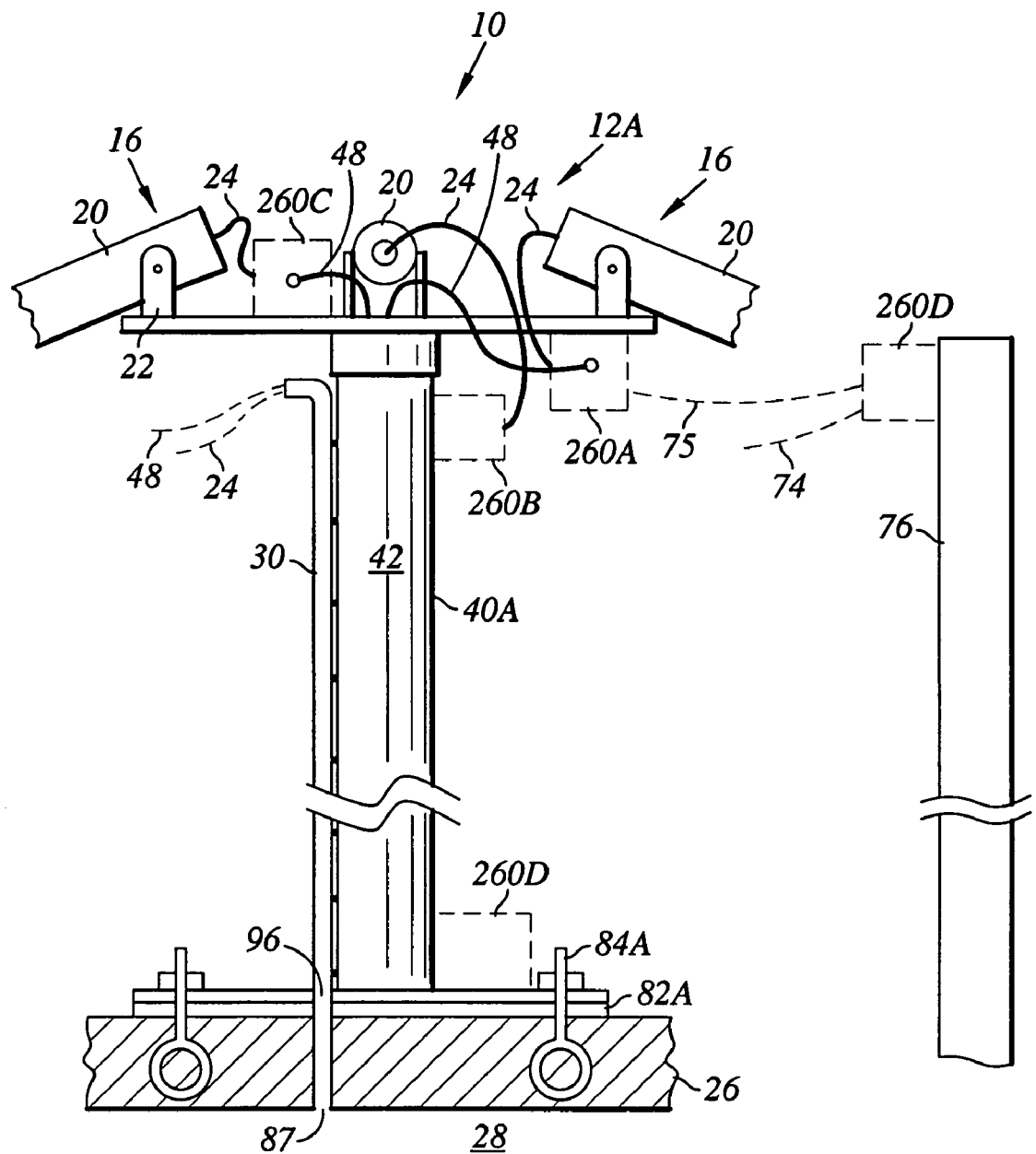
FIG. 20 is a partial cross-sectional view of another embodiment of the present invention similar to FIG. 1.

Solid poles 40 can be utilized, and when they are utilized, an armored or secured conduit is run up from the base along the side of the pole up to the top of the pole. The armored conduit, which is hollow, carries the required lines and cables from the enclosure 28 in the base to the top of the pole in the same manner that a hollow pole does (see FIG. 20). If the pole 40 is metal, the conduit 50 can be welded or secured to the side of the pole. If the pole is a polymeric material or concrete, a conduit can be glued to the side of the pole with a strong adhesive such as an epoxy adhesive. If the pole is made of wood, the conduit can be attached with an adhesive or with brackets or bands securing the conduit to the pole. In FIG. 20, the conduit and pole are metal and the conduit is welded at intervals to the side of the pole.

Figure 2:
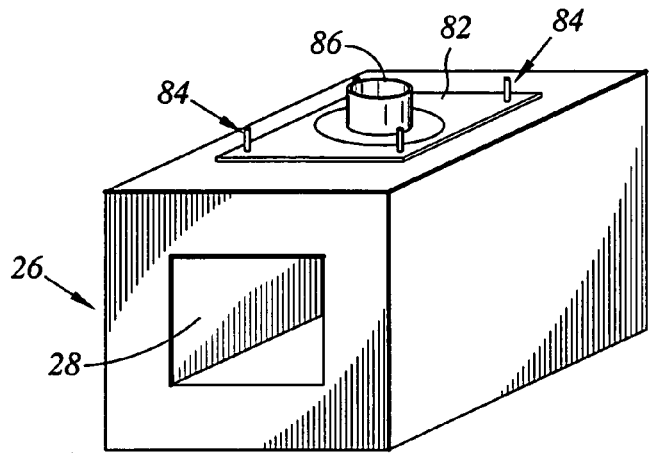
FIG. 2 shows a perspective view of the base shown in FIG. 1 comprising a substantially hollow enclosure for containing the electronics equipment, and a mounting bracket for enabling the support pole to be detachably mounted to the base.
Figure 3:
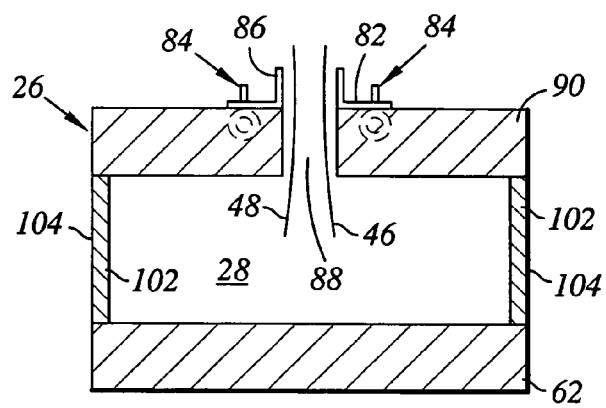
FIGS. 3 and 4 show in cross-section a side view and a front view, respectively, of the base enclosure shown in FIG. 2.
Figure 4:
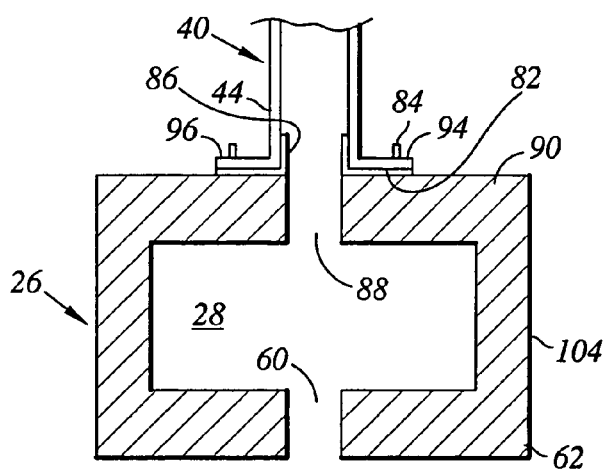

Turning now to FIGS. 2, 3 and 4, an example of suitable means for attaching the pole 40 to the concrete base 26 is shown. FIG. 2 shows the base 26 as including a steel mounting bracket 82 (for example, 24"×24"×3/16" thick) having anchor bolts 84 projecting therefrom, and a sleeve 86 welded thereto for receiving the support pole 40. As shown in FIG. 3, the base enclosure 28 includes an aperture 88 defined in a top wall 90 thereof aligned with the sleeve 86. The mounting bracket 82 is preferably secured into the concrete during the pouring stage. Turning now to FIG. 4, the support pole 40 includes a complementary base plate 94 (for example, 8"×8"× 5/8" thick), with apertures 96 for receiving the anchor bolts 84.

The necessary cables/wires 46, 48 and PVC conduit (not shown in FIG. 3) have preferably been run through and are disposed within the pole 40 prior to connecting the pole 40 to the base 26. It is noted that alternatively, a support pole 40 may be provided without a base plate 94 and thus the lower portion 44 of the support pole 40 may actually be slidably engaged with the base enclosure 28 by being slipped into the top wall aperture 88 and allowed to contact the bottom slab 62 of the base 26, or may be prevented from contacting the bottom slab 62 by suitable weldings (not shown) on the pole limiting the distance the pole 40 will slip into the base enclosure 28, or it may slide into the bottom wall aperture 60 (see FIG. 1).

Importantly, the system is constructed, so as to be tamper-resistant and indestructible for all reasonable purposes. As mentioned hereinabove, the base 26 itself is a substantially heavy structure. The base 26 also is preferably constructed so that the electronics 32 and other equipment in the enclosure 28 is effectively inaccessible by unauthorized persons. Referring briefly now to FIG. 3, cover plates 102 are provided on open ends 104 of the enclosure 28 for preventing unauthorized entry into the hollow enclosure. Each side portion of the base 26 preferably includes a steel frame (not shown) cemented therein to secure the cover plates 102 to the base. In an alternative embodiment of the base 26, the hollow only extends from one side into the base. Thus, the hollow has only a single open end and is surrounded on back end and sides by the concrete of the base. In this embodiment, only one cover plate 102 is needed to close off the single open end 104 of the hollow enclosure for preventing unauthorized entry into the hollow enclosure. The single open end of the hollow enclosure preferably includes a steel frame cemented into the base to secure the cover plate to the base and close off the open end.

Figure 5:
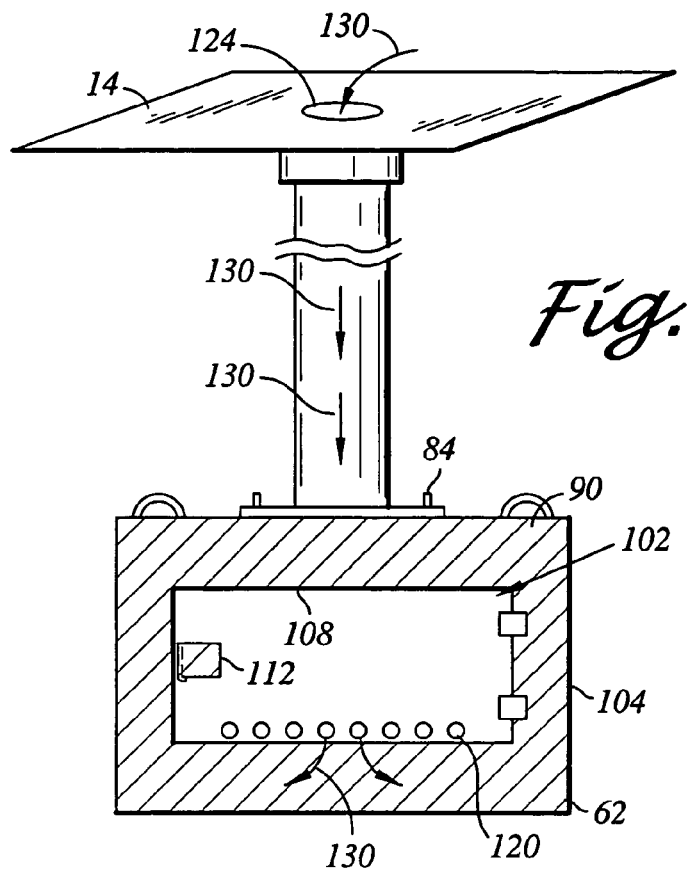
FIG. 5 shows a perspective front view of the base enclosure including a tamper-proof, steel door for enabling access to the equipment in the enclosure.

More specifically, for example, turning now to FIG. 5, the base 26 is shown wherein at least one of the cover plates 102 comprises a lockable door 108 providing means for enabling authorized access to the equipment in the base enclosure 28 while preventing access or tampering by unauthorized persons. The door 108 is "pry-proof" and may include one or more lock shields 112 enclosing a padlock[s] (not shown). The base 26 may be poured from concrete/cement at the site it is to be used. The support pole and surveillance assembly, including applicable cables and wires within the pole, may be transported from a place of manufacturing thereof, to the site and secured to the base as described hereinabove, by means of trailers and lifting cranes or other suitable machinery. Once assembled, the system is in effect, tamper-proof, and substantially indestructible.

As shown in FIG. 5, the system 10 may optionally further comprise vent means, including for example, vent perforations 120 on the door 108 for facilitating passage of air through the system 10 in order to cool the enclosure 28 and the electronic equipment 32 therein. However, vent means are purely optional and have not been found necessary in the cover plate for operation. Optionally the opening at the top of the pole can be open to the sky via a hole in the platform (see FIG. 5). The vent means is adapted to draw ambient air through the upper portion of the support post 40 and into the base enclosure 28. For example, an aperture or hole 124 in the platform 14, or alternatively in the pole 40) may be provided for enabling inflow of cool air into the pole 40 (for example in direction represented by arrows 130) and into the base enclosure 28. As mentioned hereinabove, a mechanical fan or blower (not shown in FIG. 5) optionally may facilitate the cooling process. With a ventless door, and the hollow support pole opening through a hole through the platform, the warm air raises through the pole and exits out the top and cool air enters the top and flows down into the enclosure.

Figure 6:
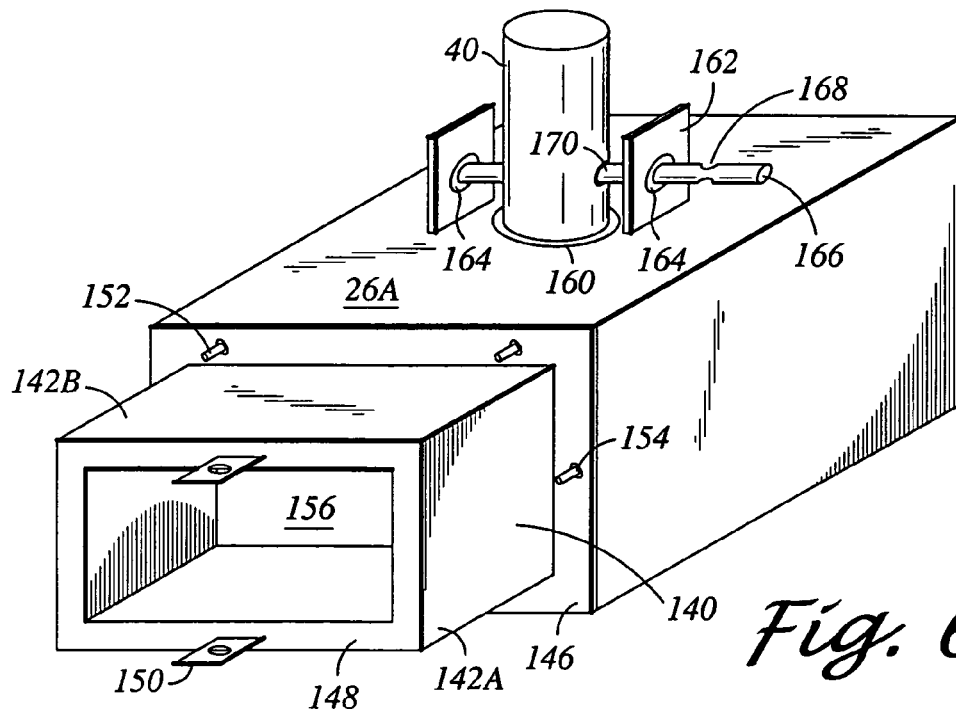
FIG. 6 is a perspective view of an alternative embodiment of the surveillance system.
Figure 7:
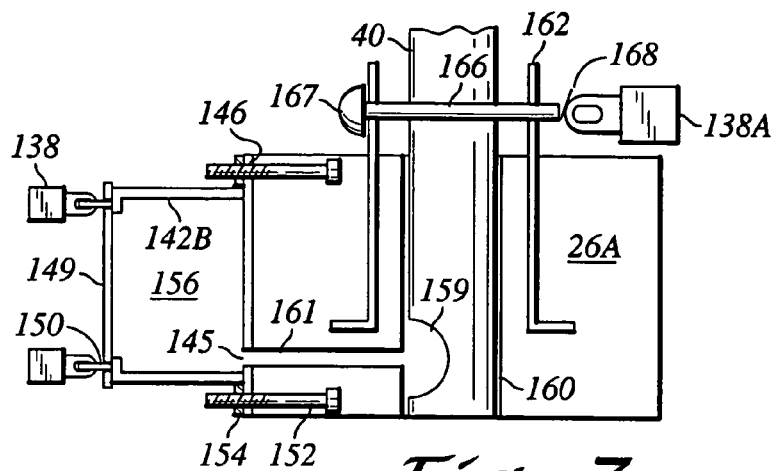
FIG. 7 is a side cross-sectional view of FIG. 6.

Another embodiment of the present invention is illustrated in FIGS. 6 and 7. The base 26A is a solid structure, such as a concrete block having a vertical pole bore 160 extending down from the top for receiving hollow pole 40. An enclosure 140 for electronic equipment and power supply is secured to one side of the base. (The enclosure could also be secured to the top of the base.) The enclosure has side walls 142A, top and bottom walls 142B and back wall 146. Back wall 146 extends outwardly beyond the walls 142A and 142B forming a skirt. The skirt has bolt holes (not shown) to receive anchor studs 152 extending out from the wall at the base. The skirt is secured to the studs with threaded nuts 154, which are welded to the studs, after tightening, to secure the enclosure.

The concrete base can be formed of lightweight concrete that contains vermiculite to give the concrete greater insulation value.

The enclosure has a front frame 148 to receive a front plate 149 to secure the hollow enclosure 156 and the electronic equipment therein (not shown). The front plate receives lock clasps 150 through apertures (not shown) in the front plate. The clasps have holes to receive shackles of locks 138. The hollow enclosure 156 communicates with the hollow pole 40 for wire and cable via hole 145 in the back plate, utility bore 161 in the base 26A, bore 160 and window 159 in the pole.

The pole 40 supporting the surveillance platform 14 is received within bore 160 of the base 26A. A pair of retaining plates 162 secured in the base are located on opposite sides of the bore. The plates have pin apertures 164. The pole has pin hole 170 which are can be aligned with apertures 164. The apertures and holes receive pin 166 which is secured on one end by head 167 and by lock 138A on the other end. The pin has lock shackle hole 168 to receive the lock.

Figure 8:
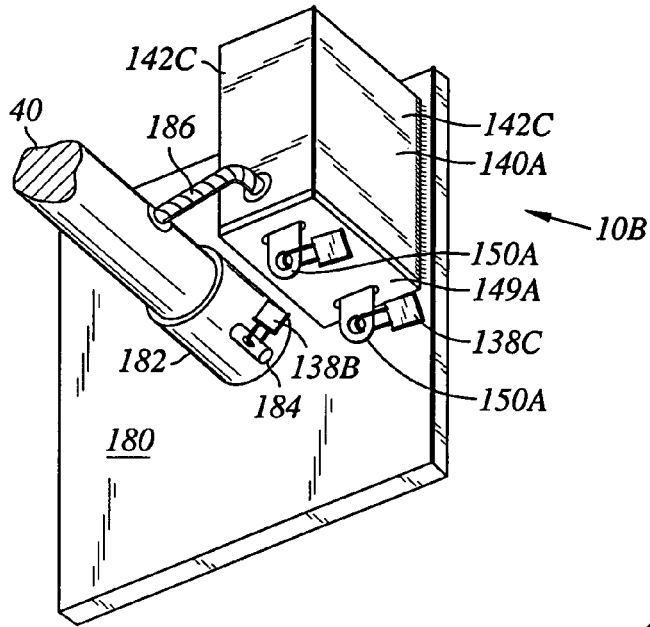
FIG. 8 is a perspective view of another embodiment of the surveillance system of the present invention.

Another embodiment of the present invention is shown in FIG. 8. The surveillance system 10B has a heavy metal plate base 180. A sleeve 182 is secured to the top of the base. The sleeve receives and secures hollow pole 40 with a pin 184 which is received in holes (not shown) in the wall of the sleeve and the pole. The pin is secured in a manner similar to pin 166 in FIGS. 6 and 7. A secured enclosure 140A for the electronic equipment and power supply is secured to the top of the base. The enclosure has front plate 149A secured by clasps 150A and locks 138C in a manner similar to the front plate 149 of FIGS. 6 and 7 with a lock 138B. The enclosure is in wire and cable communication with the hollow pole 40 by armored conduit 186.

Figure 9:
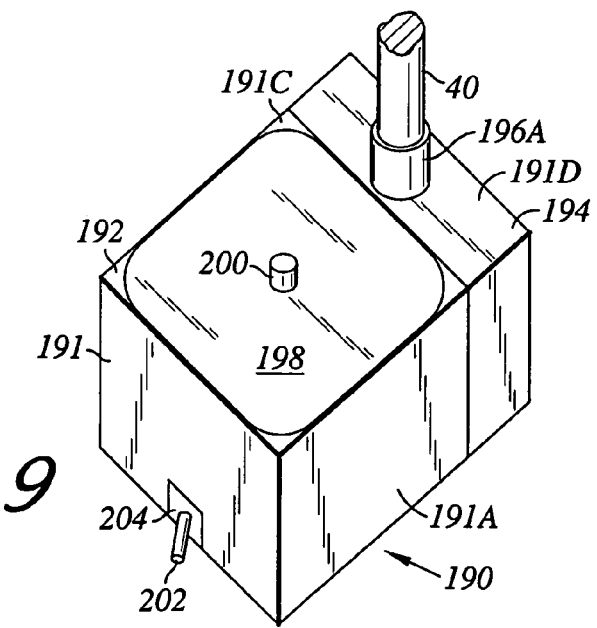
FIG. 9 is a perspective view of still another embodiment of the surveillance system of the present invention.
Figure 10:
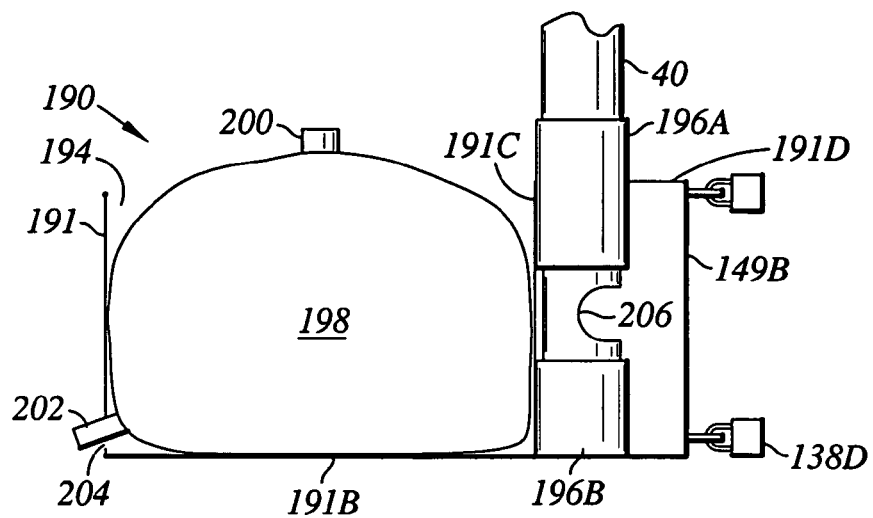
FIG. 10 is a side cross-sectional view of FIG. 9.

Referring to FIGS. 9 and 10, the base 190 comprises a housing having end walls 191, side walls 191A, a bottom wall 191B and a subdividing wall 191C within the housing running between side walls 191A and subdividing the housing into an open to compartment 192 and an enclosed compartment 194 having a top wall 191D. The compartment 194 houses the surveillance electronic equipment (not shown) and has a front plate 149B secured by clasps 150A and locks 138D in a manner similar to securing front plate 149A to enclosure 140A in FIG. 8.

The base is fitted with sleeves 196A and 196B to receive and secure the pole 40. Hollow pole 40 has a window 206 to permit communication for cables and wire (not shown) from the equipment and power supplies (not shown) in compartment 194 with the interior of hollow pole 40.

The open top compartment can receive a bladder 198 which can be filled with water via fill spigot 200 to weigh the base down. The bladder is fitted with drain spigot 202 which extends through windows 204 of wall 191 for ease of drainage. The spigots can be lockable to prevent tampering. Alternatively, the open top compartment can be filled with one or more concrete or stone blocks, or with dirt and/or sand to weigh the base down.

Figure 11:
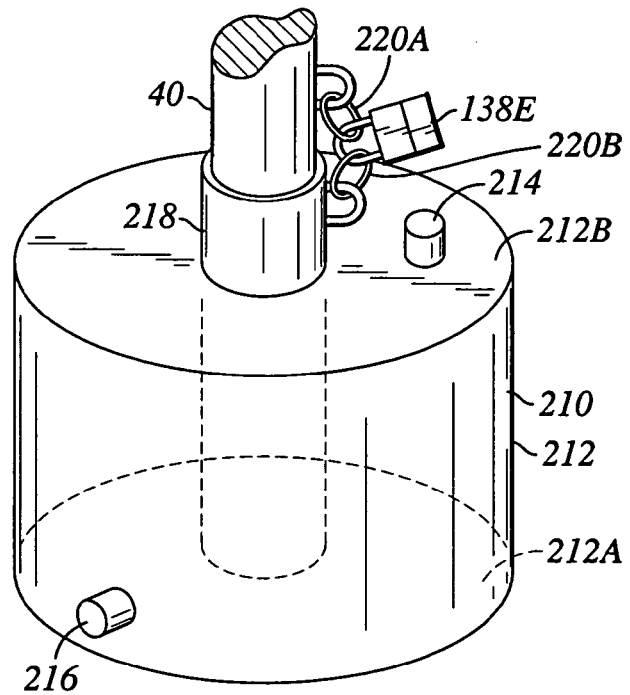
FIG. 11 is a perspective view of a further embodiment of the surveillance system of the present invention.

Referring to FIG. 11, the base 210 comprises a hollow housing having a continuous side wall 212, a bottom wall 212A and a top wall 212B. The base is designed to hold water or other fluid to weigh the base down. A sleeve 218 extends from the top of the base down to the bottom wall 212A. The top wall 212B has a fill spigot 214 and the side wall 212 has drain spigot 216. The sleeve is adapted to receive and secure hollow pole 40. The pole is secured to the base by chains 220A and 220B which are secured to the pole and sleeve and the chains are secured to each other by lock 138E. The top wall 212B or side wall 212 can be fitted with a secure enclosure, similar to the enclosure 140A and 140 of FIGS. 8 and 6, respectively, to hold surveillance electronic equipment and power supplies. The enclosure could communicate with the hollow pole by an armored conduit. Alternatively, a secure enclosure (not shown) can be attached to the pole 40 and communicate with the interior of the pole by holes through the back of the enclosure and the pole.

Figure 12:
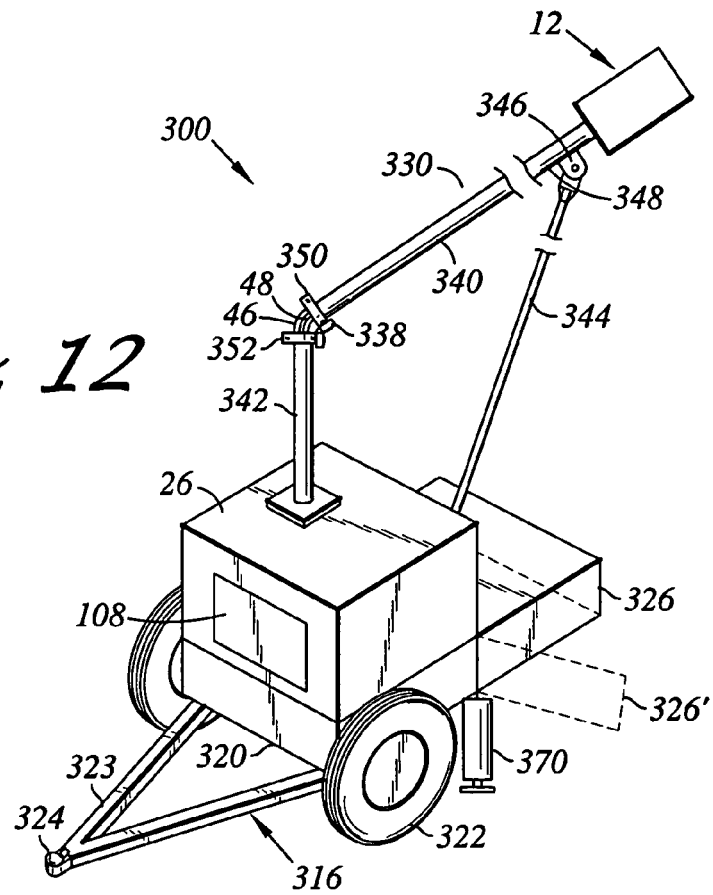
FIG. 12 is a simplified perspective view of another embodiment of the surveillance system of the present invention, including a trailer assembly for facilitating transport of the system.

Turning now to FIG. 12, still another embodiment 300 of the surveillance system of the present invention is shown, the system further comprising means for facilitating transport of the system 300 in a substantially assembled configuration, to and from a surveillance site. Particularly, the base enclosure 26 may be specifically adapted to be easily accommodated on a vehicle trailer, for example a single-axle trailer configured in a conventional manner for towing thereof by a motor vehicle.

Moreover, the system 300 may further comprise such a trailer assembly 316 that is specifically adapted to facilitate transport of the system 300. The trailer assembly 316 may include a cradle portion 320 sized to contain the base enclosure 26 and, mounted in a conventional manner on a single wheeled axle 322. The trailer assembly 316 further includes a tongue 323 and a conventional hitch 324. In the embodiment shown in FIG. 12, the system 300' is adapted for transport on a public roadway with base 26 and support pole 330 connected together and disposed in a substantially upright, vertical position during the transport thereof.

Preferably, the trailer assembly 316 further includes features which provide means for facilitating loading and unloading of the heavy, concrete base 26 to and from the trailer assembly 316. Particularly, the trailer assembly 316 may include a rear access gate 326 which functions as both a security gate during travel and as a ramp element 326' during loading and unloading of the system 300. The floor of the trailer and/or the rear access gate can be provided with rollers (not shown) to ease the passage of the base 26 on and off the trailer assembly.

In one highly advantageous aspect of the invention, the support pole 330 is height adjustable in order to enable the system 300 to be transported in the upright (or at least substantially upright), vertical position. By transporting the system 300 upright and substantially assembled as shown, the system 300 will be more easily installed at the surveillance site. By transporting the system in the vertical, upright position, the need for lifting or substantial tilting of the heavy base 26 is reduced or eliminated. In addition, the adjustable support pole 330 reduces effective height of the trailer-mounted system 300 during travel on public roadways where height restrictions are common.

For example, the adjustable support pole 330 may comprise telescoping segments (not shown). Preferably, however, the adjustable support pole 330 includes a hinge mechanism 338 adapted to enable rotation of an upper portion 340 of the support pole 330 with respect to a lower portion 342 of the support pole 330 in order to facilitate vehicle transport of the system in an upright position.

In order to provide sufficient stability and support for the upper portion 340 of the pole 330 in the rotated position, a trailer-mounted support bar 344 may be provided. Even more specifically, the pole 330 may include a support tongue 346 and the support bar 344 may include a cooperatively engaging yoke 348.

Upon arrival at a destination, or surveillance site, the base 26 is unloaded from the trailer assembly 316, for example by pulling the base 26 down the ramp element 326' using suitable equipment such as a winch (not shown). Alternatively or additionally, the trailer 316 may be initially lowered to the ground by using a fixed or demountable jacking mechanism 350 to facilitate unloading of the base 26.

It is anticipated that some types of surveillance cameras and other equipment may be sensitive to excessive vibration during travel, and therefor are preferably connected only after arrival at the site. Therefor, after unloading the base 26 from the trailer cradle 320, the desired surveillance apparatus (not shown) is secured and connected to electronic and power cables 46, 48 disposed through the support pole 330. Similarly, the necessary surveillance equipment and power supplies (not shown) may be then installed in the base enclosure 26 using access door 108. At this point, the yoke 348 and tongue 346 may be disengaged from one another and the upper portion 340 of the support pole 330, having surveillance assembly 12 mounted thereon, is rotated forward into a vertical position, facilitated by hinge means 338. Matching flanges 350, 352 on support pole upper and lower portions 340, 342, respectively, are then bolted together using suitable, locking means.

Figure 13:
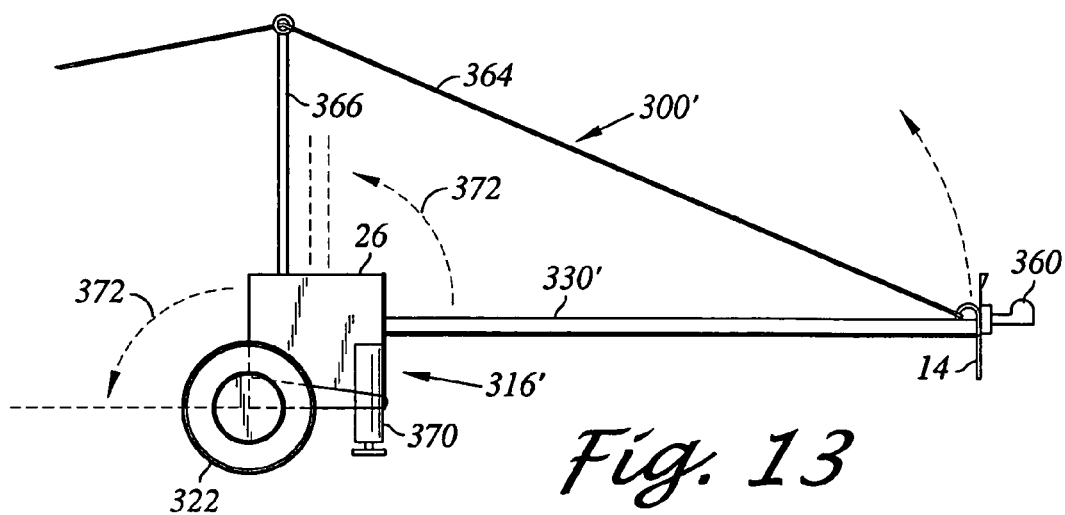
FIG. 13 is a side view of yet another embodiment of the invention, similar to the embodiment shown in FIG. 12.

Turning now to FIG. 13, as an alternative means of transport, the system 300' may be transported by a trailer, such as assembly 316', with the base 26 and support pole 330' in a horizontal position (rather than in the upright position such as shown in FIG. 12). Although other similar arrangements are contemplated and should be considered within the scope of the present invention, in this example, the base 26 rests at about a 90E angle from the upright position within the trailer cradle 320' during transport. The support pole 330' (which may be adjustable length or fixed), is fixed to the base 26, and projects substantially horizontally therefrom, and may function as a trailer tongue for towing. In this case, a fixed or demountable trailer hitch 360 may be detachably mounted on platform as shown. Alternatively still, the trailer means 316' may be adapted to cradle the base 26 in a substantially horizontal position with the support pole projecting rearward away from the towing vehicle (not shown).

Suitable means, such as a winch (not shown), lifting cable 364, and suitably placed cable leverage arm 366 may be provided for safely and controllably hoisting the pole 330 into the upright position, as shown by arrows 372, upon arrival at the surveillance site. In addition, a spider outrigger and/or hydraulic, mechanical or electrical jacks, or other means are preferably provided for supporting and stabilizing the system 300' during the lifting process. The cable leverage arm 366 is either fixed to the base enclosure 26 or detachably mounted to the enclosure base.

Advantageously, in the embodiments shown in FIGS. 12 and 13, the surveillance system 300, 300' may be transported to a surveillance site in a substantially assembled configuration, with relatively few assembly steps performed at the site.

With both embodiments shown in FIGS. 12 and 13, it is contemplated that the surveillance system/trailer assembly 300, 300', would include appropriate brakes, brake lights, signal lights and other safety equipment as may be desired or required by highway regulations for transport.

Figure 14:
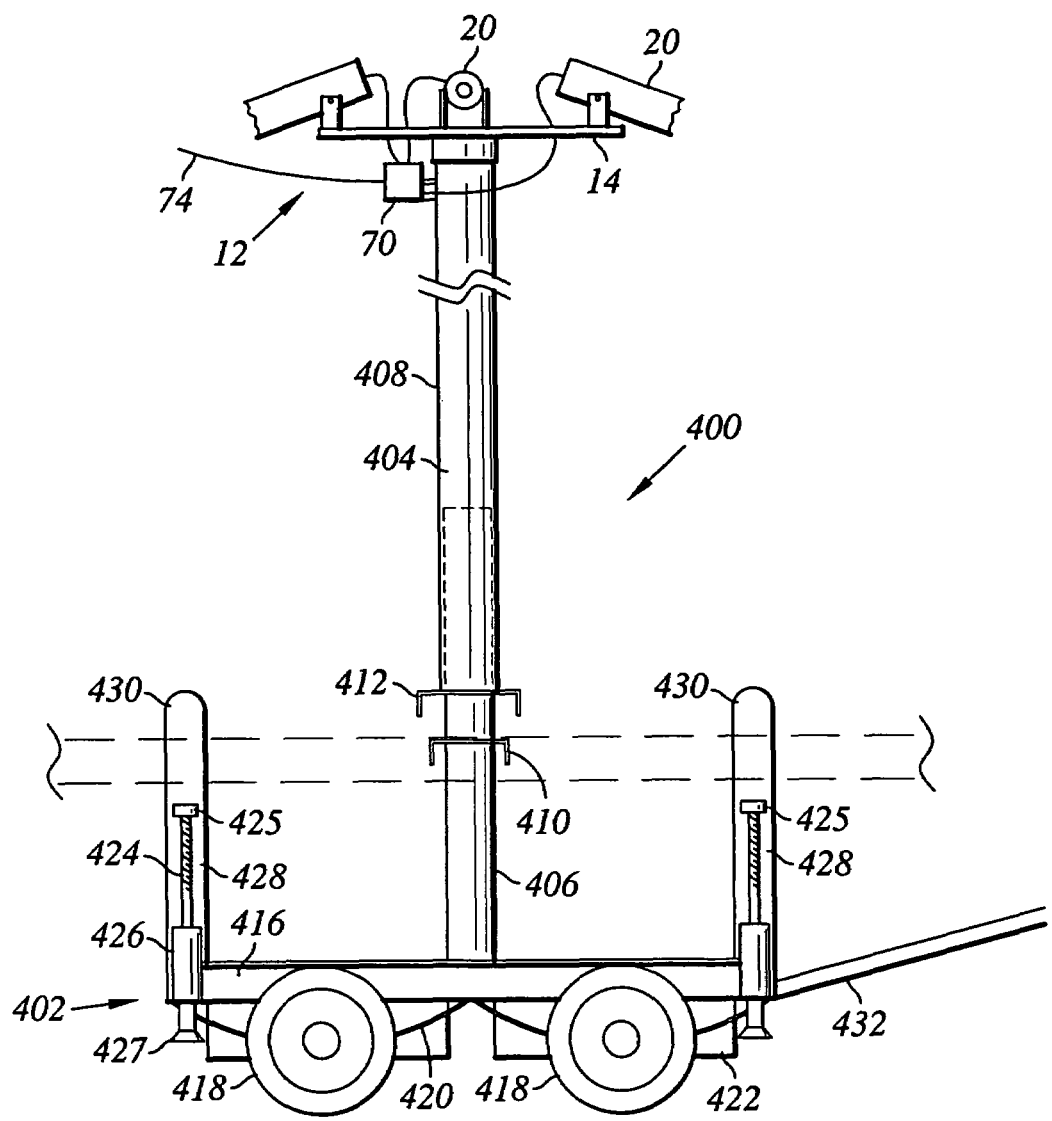
FIG. 14 is a side view of another embodiment of the system of the present invention.
Figure 16:
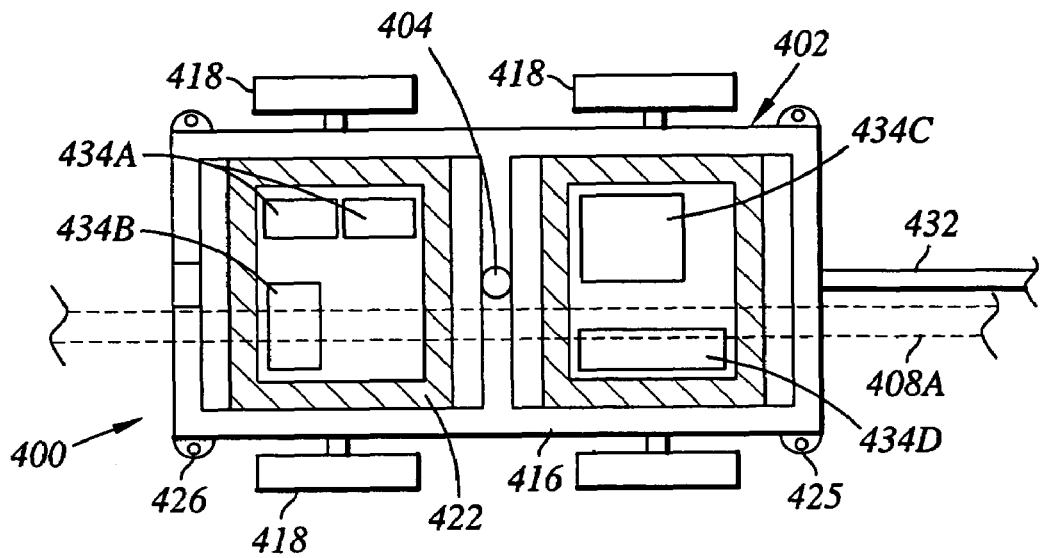
FIG. 16 is a top view of FIG. 14.

Another embodiment of the present invention is a trailer-mounted surveillance system 400 illustrated in FIGS. 14 and 16. The trailer-mounted system 400 comprises a trailer 402 with trailer frame 416 on which is mounted a telescoping pole assembly 404. The electronic surveillance equipment, battery packs, controls and the like for the surveillance system are in secured enclosures 434A through 434D, which are shown in FIG. 16, are mounted on the trailer. Trailer 402 has a frame 416 which is supported by twin wheel assemblies 418 comprising wheels and axles and suspension spring systems 420. The frame is weighted down with ballast 422 which can be cement blocks, tanks filled with sand, gravel, concrete or water. The pole assembly 404 comprises two or more members, a lower pole base member 406 and a pole upper member 408 which is telescopically received on the pole base member 406. Mid way up the pole base member there is secured a base flange 410 and at the bottom of the pole upper member, there is secured an upper flange 412. The flanges limit the penetration of the pole base member 406 into the pole upper member and are used to secure the two members together either with bolts, locks or the like. The two pole members are preferably hollow so that wiring and cabling (not shown) can be run from the surveillance assembly 12 on the platform 14 down through the pole assembly 404 and out a window or aperture (not shown) in the pole base member so that the wire and cabling can go to the appropriate electronic equipment in the secured enclosures 434A through 434D. The wire and cabling in the pole base member to the enclosure are secured in armored conduit or the like. At either end of the trailer, there are supports masts 428 which are mounted off the longitudinal centerline of the trailer. Support forks 430 are attached to the top of the support mast 428 and are adapted to receive the pole upper member when the pole upper member is disassembled from the pole base member during transportation, or during storage, or the like. During transportation or storage, the pole upper member can be secured in the support forks with cable or chain and lock, or with pins and lock.

On the four corners of the trailer frame 416, there are secured support jacks which are lowered into position to lift the trailer and support most of its weight when the trailer has been moved to a desired location for use. By actuating the support jacks and lifting the trailer, the trailer is made immovable and stabilizes the trailer from the effects of wind and the like. The support jacks can be screw threaded jacks 424 which ride in threaded supports 426. The top of the threaded screws have a head 425, such as a hex head to receive a wrench to move the screw up or down. The support jacks can have a lock to prevent tampering. The base of each threaded screw has a base 427 adapted to rest on the ground.

At the front of the trailer, there is secured a conventional trailer hitch assembly 432 which can be pivoted up and downwardly like conventional trailer hitch assemblies. At the end of the hitch assembly (not shown), there is mounted a trailer hitch for securing the trailer to a vehicle for movement to and from locations.

In operation, the trailer-mounted surveillance system is utilized in the same manner as the other surveillance systems disclosed herein. A trailer-mounted surveillance systems can be used in situations where the system is to be moved periodically from location to location and/or in situations where it is desired to move the surveillance system quickly onto and on off a site. It is envisioned the trailer-mounted surveillance system will be used for short-term events, such as rock concerts, auto races, sporting events, such as college football games, professional sport games, political rallies, people's marches and the like.

The trailer-mounted assembly will be stored most conveniently with the pole assembly 404 taken down by removing the pole upper member from the pole base member and placing the pole upper member onto the cradle created by masts 428 and support forks 430. Normally, the platform 14 of the attached surveillance assembly 12 will be removed from the top of the pole upper member when the pole assembly is disassembled. During transportation, the pole upper member will be transported in the cradle and the surveillance assembly 12 will be stored in the vehicle pulling the trailer or on the trailer itself. When the trailer has reached the location where it is to be used, the trailer will be positioned, the jack stands will be extended downwardly to lift the trailer off the ground, the pole upper member will be lifted and inserted over the pole base member 406. Before elevating and erecting the pole upper member, the platform 14 and surveillance assembly 12 will be mounted on the top of the pole upper member. Power from the utility system can be conveniently brought to the mobile surveillance system via power line 74 into a distribution box 70 as described herein.

Figure 15:
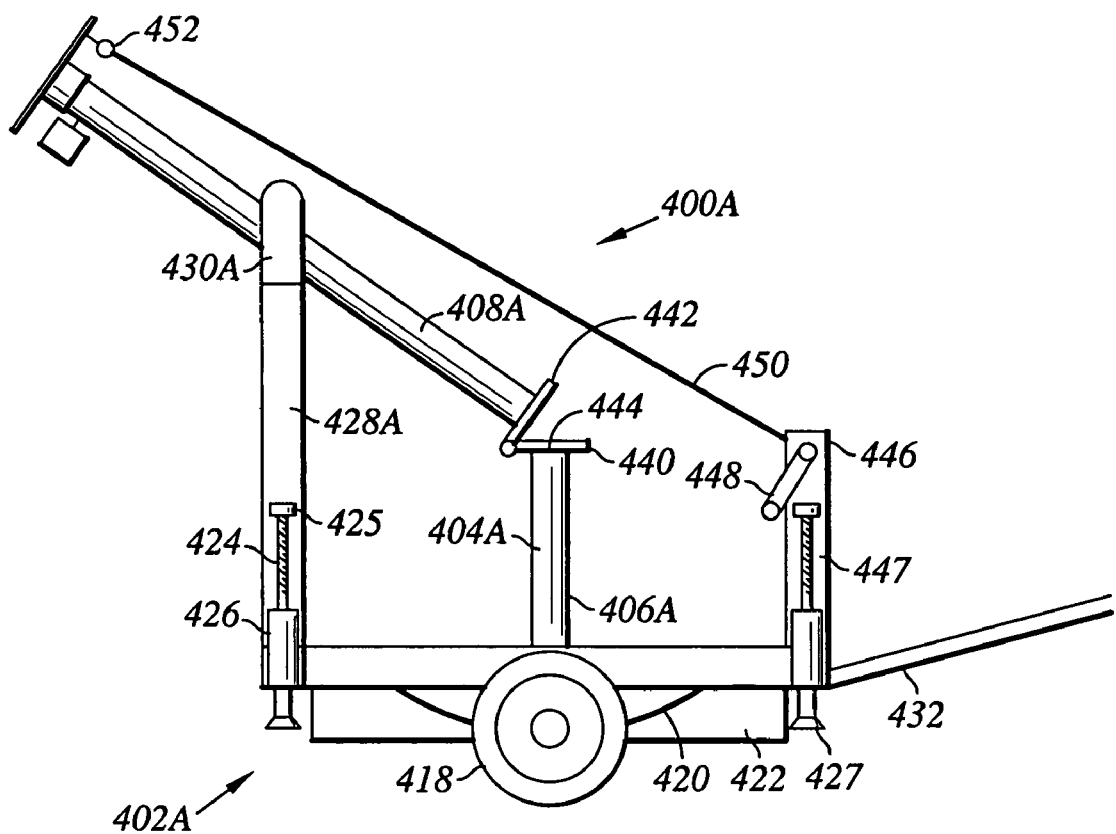
FIG. 15 is a side view of another embodiment of the system of the present invention.
Figure 17:
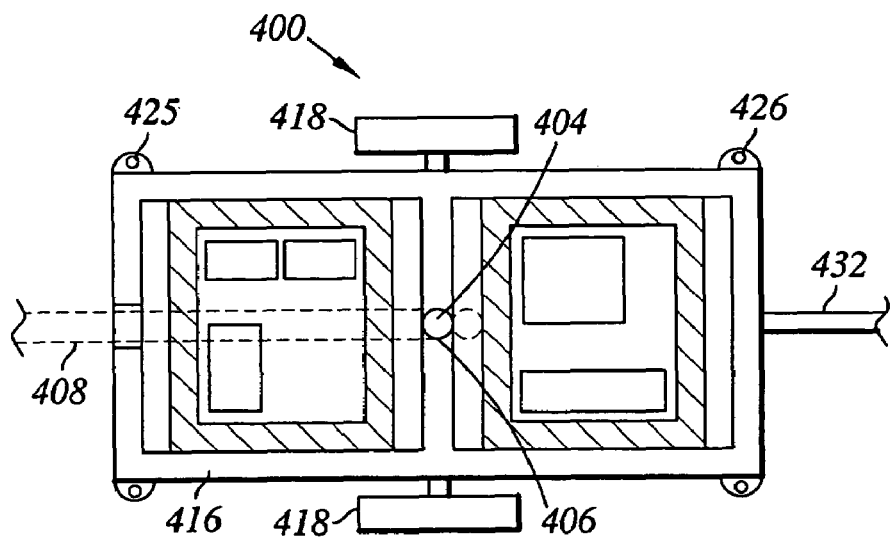
FIG. 17 is top view of FIG. 15.

The mobile surveillance system 400A shown in FIGS. 15 and 17 is very similar to the mobile surveillance system 400 except that in this embodiment, the trailer 402A has single wheel assembly 418. In addition, the pole assembly 404A is a pivoted pole assembly having a pole base member 406A and a pivotable pole upper member 408A attached thereto. A hinge assembly 440 is secured to the pole base member and the pole upper member. The upper base member pivots on the hinge assembly. The hinge assembly has a upper flange 442 and a lower flange 444. When the pole upper member is pivoted upwardly to a vertical direction, the upper flange and bottom flange mate and can be secured together with threaded bolts and nuts and/or locks to secure the pole assembly. To aid in lifting the mast, the mast can be fitted with a windlass system comprising a windlass 446, a windlass handle 448, a cable 450 attached to the windlass drum (not shown) at one end and attached to the upper portion of the pole upper member by cable attachment 452.

During storage and transportation, the pole upper member will be pivoted downwardly so that the trailer mount and surveillance system can travel on the road and clear underpasses, bridges, power and telephone lines, and the like. When the mobile surveillance system is to be used at a location, and the trailer has been placed in the desired location, and the trailer lifted by the jack assemblies, the surveillance assembly 12 (not shown) and platform 14 are mounted on the top of the pole upper member 408A and then the pole upper member is pivoted upwardly on the hinge assembly 440 by winding up the windlass assembly. When the pole upper member is in a vertical direction, the upper flange and bottom flange is secured together as mentioned above with threaded nuts and/or locks. When the mobile surveillance system has completed it operation, the upper flange 442 and lower flange 444 are unsecured and the windlass is let out to permit the pole upper member to pivot downwardly as shown in FIG. 15. The pole upper member is supported in the downward position by mast support 428A and fork support 430A. The pole upper member can be secured in the fork by rope, cable, chain and lug pin.

Figure 18:
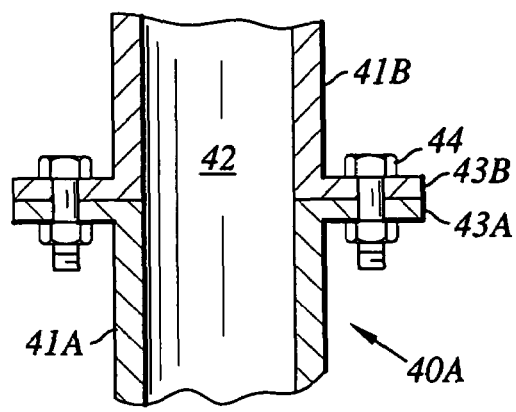
FIG. 18 is an enlarged fragmentary cross-sectional view showing the joinder of two pole sections of the surveillance equipment of the present invention.
Figure 21:
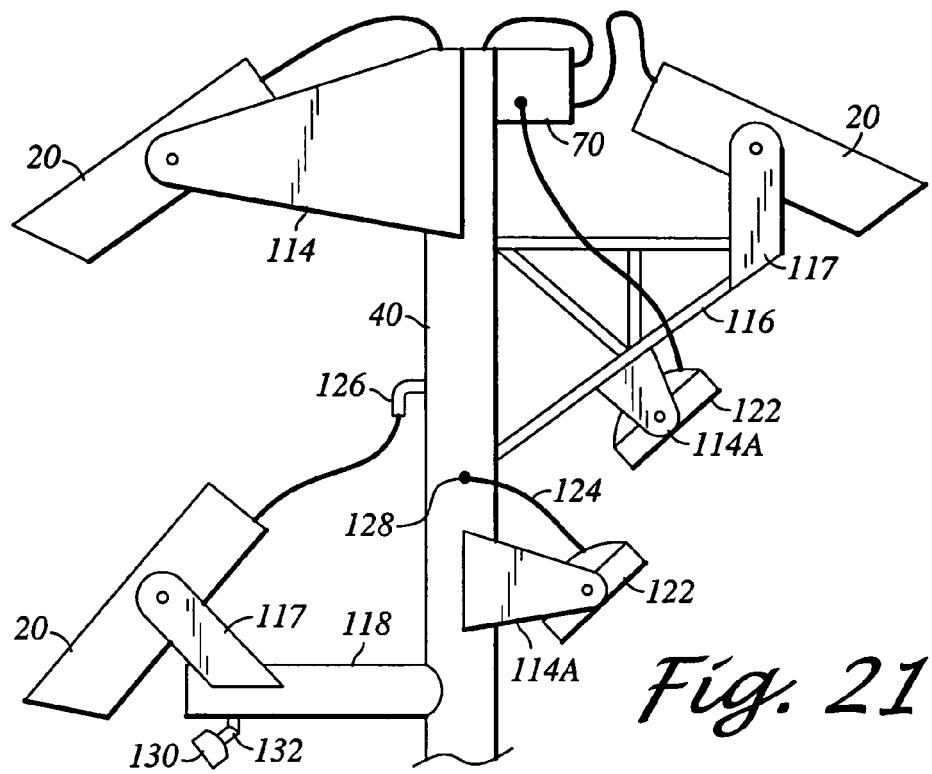
FIG. 21 shows another embodiment of the mounting of surveillance equipment on the pole of the present invention.

Referring to FIG. 18, a portion of the pole segments 41A and 41B of pole 40A of FIG. 21 is shown. The pole segments 41A and 41B at each end have flanges 43A and 43B, respectively. The flanges have a series of holes which mate with the holes of the adjoining flange of the adjoining pole segment.

The flanges are secured together by threaded bolts and nuts 44 in a conventional manner. A segmented mast, permits the mast to be disassembled into smaller parts or segments for transportation and/or storage. In addition, the height of a mast can easily be controlled by adding or subtracting segments as desired. The pole can be assembled prior to it being installed on the base 26. Segments are joined at their flanges and the flanges are bolted together in a conventional manner. The bolts can be drilled to receive the shank of locks in order to lock the bolt assemblies to prevent the mast from being disassembled. The flanges can be fitted with gaskets, O-rings, and the like, to seal flange joint to prevent the entrance of moisture and the like into the hollow bore 42 of the pole.

Figure 19:
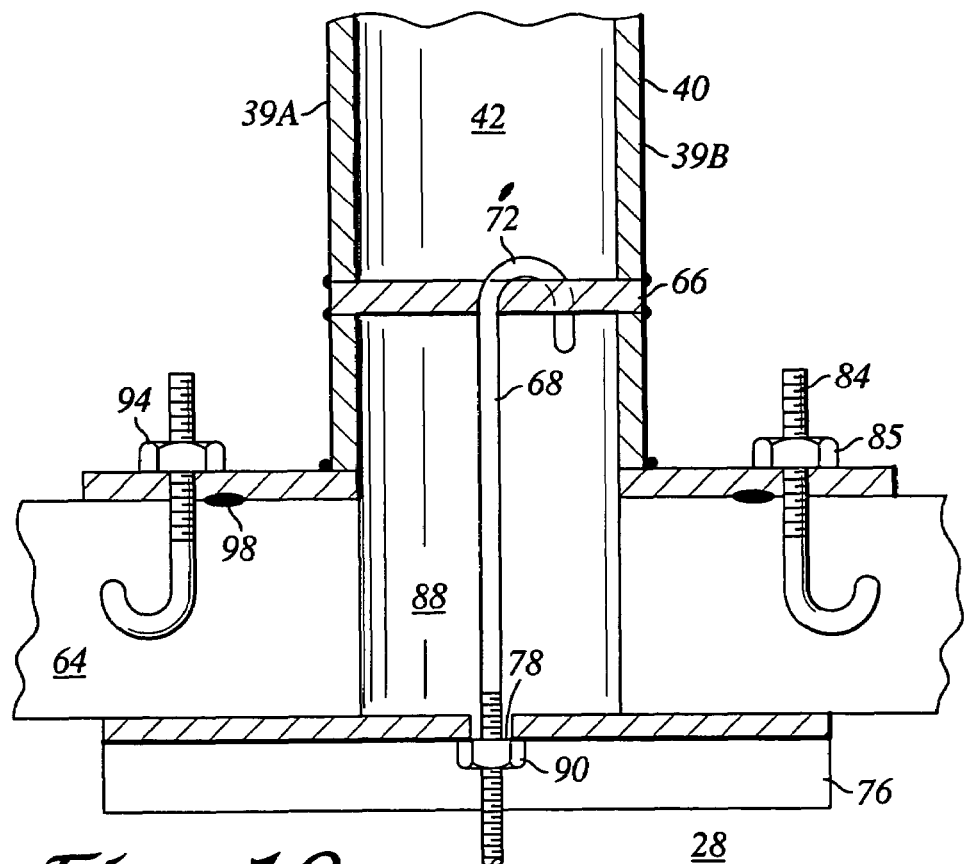
FIG. 19 is a partial cross-sectional view of the bottom of the mast and the top of the platform of another embodiment of the present invention.

Referring to FIG. 19, to prevent the unauthorized disassembly of the pole 40 from the base 26, the lower portion of the pole 40 is fitted with a metal rod or pipe 66 which extends across the hollow bore 42 of the pole and is secured in the opposing walls of the pole. A J-bolt 68 is inserted from the enclosure 28 through the bore 88 with the hook 72 of the J-bolt engaging the rod 66. A strong bracket 76, such as a L-bracket or U-bracket, or husky piece of pipe with a bore 78 is positioned in the center of bore 88 and the end of the J-bolt is extended through the bore 78 of the bracket. A threaded nut 90 is then threaded onto threaded end of the J-bolt and tightened to place tension between the rod 66 and the bracket 76 to secure the mast. In this manner with the enclosure 28 being sealed off with secured cover plates 102, the mast is secured to the base even in the event threaded nuts 85 are removed from the threaded studs 84. Although an unauthorized person can remove threaded nuts 85, they cannot lift the mast off the threaded studs 84 because the J-bolt secures the base of the mast against the top wall 64 of the base 26. In the embodiment of FIG. 19, the threaded studs 84 are J-bolt studs, the hook end of the J-bolt being embedded in the concrete in the top wall 64 of the base.

Referring to FIG. 20, a current breaker is preferably utilized with the system 10 to ensure protection against short circuits and power surges which could permanently damage the electronic equipment. The surveillance system is preferably fitted with a circuit breaker to which external power or the power supply first feeds power before power is distributed to the electronic equipment and the surveillance equipment, such as the cameras, recorders, sensors, and lights. However, current breaker does not have to be installed within the enclosure. The enclosure is a convenient place for the current breaker since it secures the current breaker, protects it from environmental conditions and renders easy access to it in the event that the circuit breaker is activated and cuts off current to the electronics, etc. The current breaker can be placed in the enclosure, it can be mounted on the bottom of the platform 260A, or at the top of the pole 260B, or on top of the platform 260C, or at the base of the pole 260C, or even at location where connection is made with the external power, signal and communication lines. Preferably, the current breaker is mounted in a box or housing that is secured against outside tampering and environmentally protected against rain, dust, and the like. This particularly true in the case where the circuit breaker is mounted in a box that is nearer to the ground where someone can easily access it. When the circuit breaker is mounted at the top of the mast or at the bottom of the mast, preferably the circuit breaker connects directly into the interior bore 42 of the pole through a hole in the pole and box (not shown). Cable and wiring can easily be extended through the holes between the current breaker box 260D or 260B and the hollow bore (not shown in FIG. 20).

When the current breaker is mounted under the platform (260A) or on top of the platform (260C), external wiring may have to be used which normally will extend through the hollow bore 42 from the top of the support pole into the hollow enclosure 28 of the base through a hole in the base (not shown in FIG. 20). Similarly, when the box for the current breaker 260D is mounted on the power pole, the lines and cables between the surveillance system and the current breaker enclosure may be external.

With the circuit breaker 260D, external power can go through a distribution box 70 from a power line 74 (see FIG. 1) and then through a power line from the distribution box to the current breaker. The power line can be external and contained within a conduit similar to conduit 30 or it can go internally through the hollow bore 42 of the pole through holes in the pole preferably between the wall of the pole and the distribution box, and through a hole between the wall of the pole and the current breaker 260D. Electrical power from the current breaker is distributed to the surveillance equipment and electronics through lines extending through the hollow bore of the pole and into the hollow enclosure of the base via a hole in the top of the base not shown in FIG. 20. When the current breaker 260C mounted on top of the platform or the current breaker of 260A is mounted underneath the platform, the current breaker can be located in the distribution box which receives power from a power line from an external source. Power from current breakers 260A and 260B would be supplied to the surveillance equipment and electronics on the platform and to surveillance equipment and the electronics in the enclosure of the base. Preferably, there would be a hole through the back of the enclosure for the current breaker 260B into the hollow pole through which the power line would pass and extend down through the pole and through a hole (not shown in FIG. 20) in the top of the base into the hollow enclosure of the base to power the surveillance equipment and electronics in the enclosure. Alternatively, the power to be supplied through a line running down a conduit such as conduit 30 into the hollow enclosure in the base. When the enclosure for the current breaker is mounted at the top of the surveillance system, the enclosure for the current breaker can also act as the distribution box to connect the external power source via line 74 with the power supply in the base, to connect a signal transmission line 75 to an external source, to connect the surveillance equipment 16 with the electronic equipment 32 in the hollow enclosure in the base via line and cables 24 with the electronic equipment 32, to connect the lights (see FIG. 21), to the power via power line 124, to connect the power to the electronic equipment in the base.

FIG. 20 also shows an embodiment of the invention wherein the pole 40A is either not hollow or the internal space 42 in the pole is not utilized for the lines and cables. In that case, the base 26 has a small orifice 87 which is in communication with an armored conduit 30 extending from the base plate 94 to the top of the pole where the conduit can end in an elbow through which extends wiring cables 24 and 48 (shown in phantom). Face plate 94 has an orifice 96 which is coaxial with orifice 83 and the mounting bracket 82A which in turn is coaxial with orifice 87 in the top wall of the base. The cables and lines 48 and 24 extend from the top of the armored conduit 30 and extend down through (not shown) the armored conduit through orifices 96, 83 and 87 into the enclosure 28. If the pole is metal and the armored conduit is metal, the armored conduit can be welded to the pole. If the pole is synthetic composite or concrete, the armored conduit can be conveniently glued to the pole with epoxy adhesives and the like. If the pole is wood, the conduit is conveniently secured to the pole with straps in a conventional manner (not shown).

Now referring to FIG. 21, although the surveillance equipment 16 can be conveniently mounted on a horizontal platform secured to the top of the pole 40, other means can be utilized to secure the surveillance equipment, including cameras 20, lights 122, motion sensors 130, and the like. Video cameras 20 can be secured to two large parallel plates 114 secured to opposing sides of pole 40 shown in FIG. 21. Alternatively, a cantilevered girder bracket 116 can be utilized to support the video camera utilizing end plates 117. In another embodiment, the video camera 20 can be supported by a tubular member or pipe bracket 118 which can be conveniently welded to the side of the pole and extend vertically outward. End plates 117 can be welded to the end of the pipe bracket 118 to support the video camera. A motion detector can be secured to any of these brackets. In the embodiment shown in FIG. 21, a motion detector 130 is connected to the pipe bracket 118 via hollow connector 132. Wiring from the sensor to the electronic equipment flows through the hollow connector, through the hollow pipe bracket 118 and through the hollow pole 40 to the electronic equipment in the base. Similarly, high intensity lights, preferably halogen-type lights, although other types of lamps can be employed, are secured to lamp brackets 114A. Lamp brackets 114A can be attached to any of the brackets shown. For example, a lamp bracket 114A is shown attached to the girder bracket 116. In another embodiment, the lamp brackets 114A are shown secured to the side of the pole 40. Wiring to and from the lamp can go into a hole in the side of the pole sealed with a grommet 128 or the power line can go from the lamp to the distribution box 70. Cabling for the digital cameras can go directly into a pole through an elbow 126 or extend through the top of the pole down through the center of the pole to the electronic equipment in the base, or the cabling can go into the distribution box 70 and cabling from the distribution box can extend to the top of the pole down through its hollow center to the enclosure 28 in the base. If the electronic equipment is mounted in a location other than the base, the wiring and cabling are routed to it in a manner to ensure the wiring and cabling are secure against tampering and destruction.

Although several mounting means are shown in FIG. 21, other means can be employed to mount the video and digital cameras, the lights, the motion sensors, and the like. The flat horizontal platform mounted top of the pole has been found to very advantageous because of its light weight. A thin metal sheet has been utilized which is reinforced with stiffening braces. It is relatively light weight and it maintains the center of gravity of the entire surveillance system within the base. By keeping the center of gravity within the base, the surveillance system is far more difficult to tip over.

Figure 22:
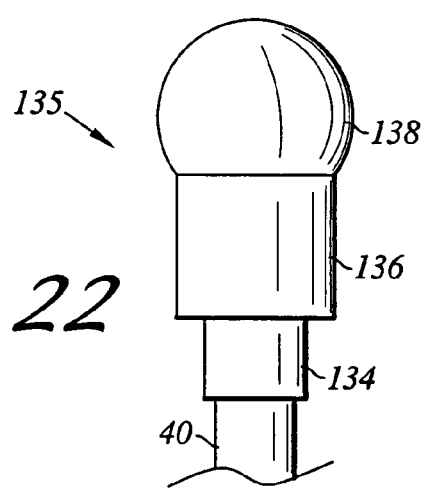
FIG. 22 shows another embodiment of the surveillance equipment for the present invention.

Referring to FIG. 22, surveillance equipment employing a single camera can be employed. Surveillance camera 135 is illustrated in FIG. 22. The camera is mounted at the top of pole 40. The camera has a clear or darkened protective hemisphere 138 protecting the video or digital camera from environmental conditions. The hemisphere is mounted on an enclosure 136 containing the mechanical and electronic equipment for the operation of the camera. The entire camera 135 is mounted on a mounting sleeve 134 which is secured to the top of pole 40. The camera has the ability to rotate, pan, and preferably zoom. Motion detectors and lamps, etc., can be secured to the pole. In addition, other cameras could also be attached to the pole employing brackets such as the brackets illustrated in FIG. 21.

Figure 23:
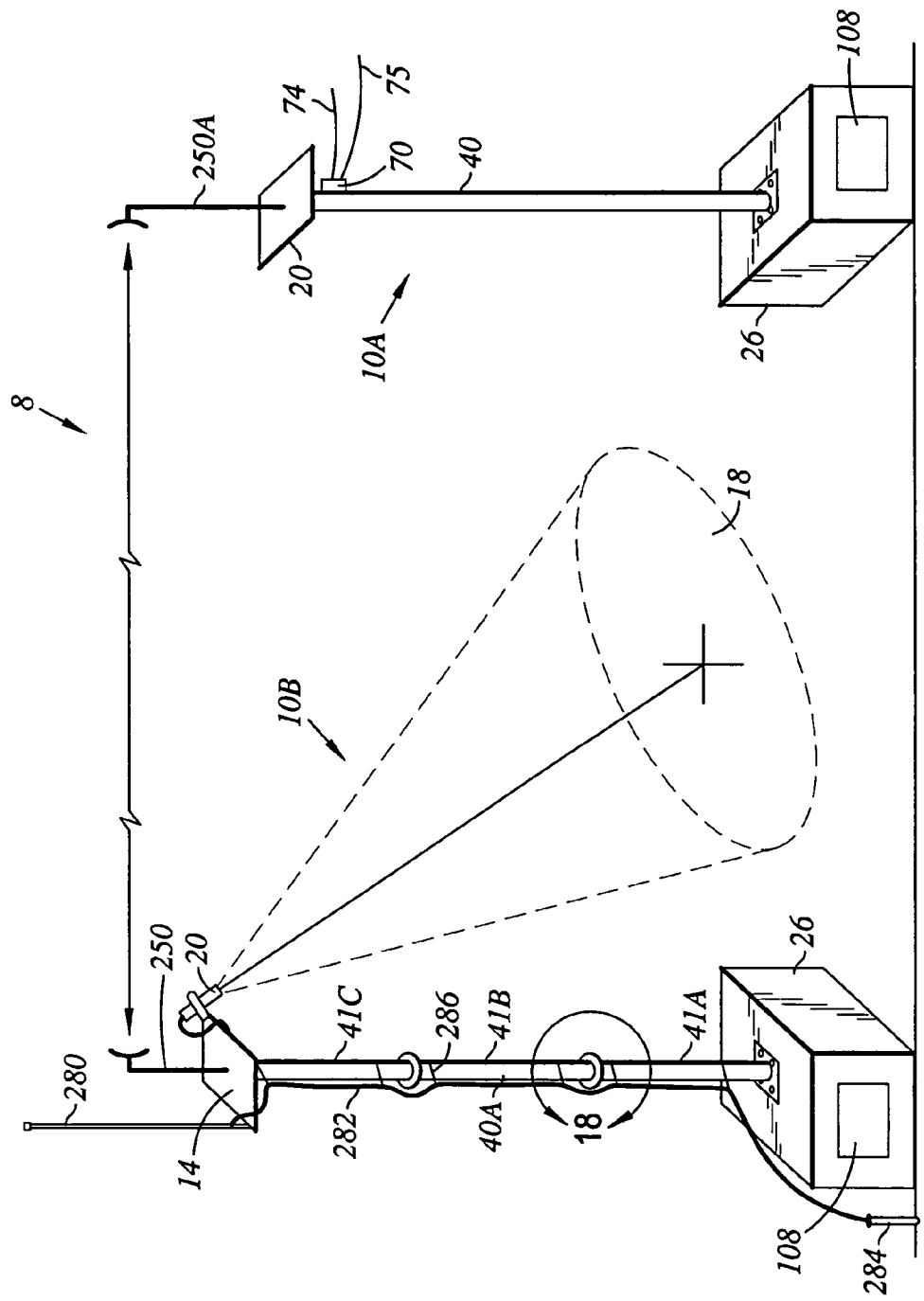
FIG. 23 shows another embodiment of the surveillance system of the present invention.

Referring to FIG. 23, a wireless surveillance system 8 is show. A wireless surveillance system will normally be utilized in a situation where either above ground or below ground transmission facilities for power and signals are not available. For example, if an event is to take place in a large parking lot comprising many acres, it may not be possible entrench lines under the ground or to position poles to support high wire transmission and power lines. In the embodiment shown, there is a master transmitter/receiver surveillance system 10A and a subservient or slave surveillance system 10B. Although only one subservient surveillance system 10B is illustrated in FIG. 23, the wireless surveillance system can employ a plurality of subservient surveillance systems and even more than one master surveillance system. Although in FIG. 23, the master surveillance system is shown having the base 26 and pole 40 with the equipment in the enclosure within the base, the master surveillance system may be a temporary building, permanent building, trailer-type building, or the like, having an antenna extending upward to communicate with the slave surveillance systems. Distribution box 70 is mounted at the top of the pole 40 and power and signal transmission lines 74 and 75 are connected to distribution box to an external source (not shown). At the top of the pole, there is a platform 14, which is optional in this case. The master surveillance system 10A may have cameras, lights, and motion sensors. At the top of the pole or on the platform, there is mounted an antenna 250A for transmitting and receiving signals such as radio signals, microwave signals, video signals, or the like, for one or more subservient or slave surveillance systems.

The subservient surveillance system 10B has a base 26, a segmented pole 40A, a platform 14 at the top of the pole having one or more video or digital cameras 20. An antenna 250 extends upward from the top of the platform and is position to receive and transmit signals to antenna 250A of the master surveillance system 10A. The entire power supply for subservient system comes from the power supply in the base 26 and optionally from an ancillary power supply which is conveniently housed within a duplicate base 26 positioned next to base 26 surveillance system 10B and connected by secure or armored conduit. Real time images from the cameras of surveillance system 10B can be transmitted to the master surveillance system 10A. Alternatively, image information can be stored in the electronic equipment within the enclosure of 26 of the subservient system and transmitted to the master surveillance system upon request of the master surveillance system. Data, command signals, addresses, etc., can be transmitted and received by both systems employing wireless transmitting equipment, receivers and transmitters. The video or digital camera 20 picks up the activity within the observed area 18. Motion detectors can be installed on the surveillance equipment 10B to activate the cameras only when there is activity. This saves power. However, if the surveillance system 8 is being utilized for an activity where there is a lot of motion, such as a political rally, or the like, a motion detector would not be utilized because of the constant motions. A motion detector is normally limited to use when motion is not expected in the observed area 18.

Frequently the poles of the surveillance system are the highest point in an area, especially large flat areas. In certain areas of the country, lightening is a common occurrence and strikes the highest object in the vicinity. In those areas, the surveillance system is conveniently outfitted with a lightening arrest system comprising a lightening rod 280, an electrical discharge cable 282, and a ground 284. The cable connects the rod 280 with the ground 284. The ground is normally driven into the ground three to six feet to ensure good conductivity with the ground. A lightening arrest system is preferably installed in all the surveillance systems where lightening is a threat. For purpose of illustration only, the lightening arrest system has been only shown on the subservient system 10B in FIG. 23. However, it normally also will be employed on the master system 10A.

The subservient surveillance system 10B of FIG. 23 has a segmented pole 40A. The segmented pole is made up of three segments 41A, 41B and 41C. For storage and transportation, the pole is broken up into its individual segments. When the surveillance equipment is installed, the mast is assembled from the segments and erected as described herein. In the embodiment shown, the three segments are secured together by flanges (see FIG. 18). The pole can have two or more segments to achieve the desired pole heights.

In one embodiment of the present invention, the surveillance system is tied into telecommunication lines, either twisted wire lines or cable lines. This permits monitoring of each surveillance system via the Internet from remote computer locations. Thus, it is possible from a single location, any place in the country, to monitor thousands of surveillance systems at command. Each surveillance system would have its own Internet address. The operator could access any surveillance system any time. In addition, the surveillance system can have a code which provides double security, only permitting access to the information stored within the surveillance system, and only permitting commands to the surveillance system upon the proper entry of the password. The same system also provides and gives the operator the opportunity from a remote location to modify the operation of a surveillance system via commands over the Internet. For example, if zoom or pan cameras are employed on a surveillance system, control of such cameras can be accomplished over the Internet. In addition, a command can be made to have the lights turned on a dusk, to only have the system activated when the motion detector picks up activity, to have the surveillance system issue a signal alarm through the Internet to the control system address when motion detector picks up activity, and the like.

In another embodiment of the present invention, the surveillance system can fitted out with directional microphones, which can be mounted on devices for panning and rotating the microphones in order to direct the microphones to noises and voices. Conveniently, such directional microphones will be integrated with a sound detection system which will activate the microphones and the recording equipment for the microphones when the noise, other than the background noise, is detected.

Figure 24:
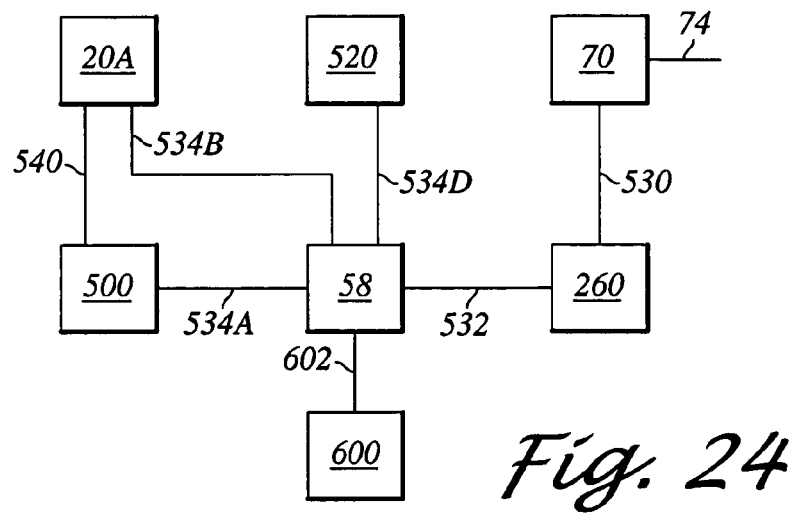
FIG. 24 is a schematic of one embodiment of the surveillance system of the present invention.

Referring to FIG. 24, electrical power from an external source is fed to the surveillance system through power line 74 to a distribution box 70. The power from the distribution box is passed to circuit breaker 260 through line 530 which preferably passes through the hollow bore of the pole or support tube. Electrical power from current breaker 260 is fed to a distribution box or panel 58 through line 532. The distribution panel can be part of the circuit breaker. From the distribution panel 58, power is supplied to a digital camera 20A through line 534, optionally to a motion sensor 510 through line 534C and optionally but preferably to a lighting device 520 through line 534D. The surveillance system will normally have more than one camera and more than one lighting device. The system can also be supplied with one or more motion detectors. The system has a recorder conveniently a digital recorder 500 which is powered through line 534A. Lines 534B, 534C and 534D pass from the base up through the hollow bore of the pole to the camera, the motion detector, and lighting device mounted on the platform. Data from the digital camera is sent to the recorder via line 540. In the preferred embodiment of the invention, the digital camera is on full time. The digital recorder can store at least a week of filming information. When the surveillance system is equipped with a motion detector, the motion detector can turn on the lighting device for a predetermined time such as five minutes, unless the lights are already on. The lighting device is normally on during the dark hours and is activated by a photosensor.

Figure 25:
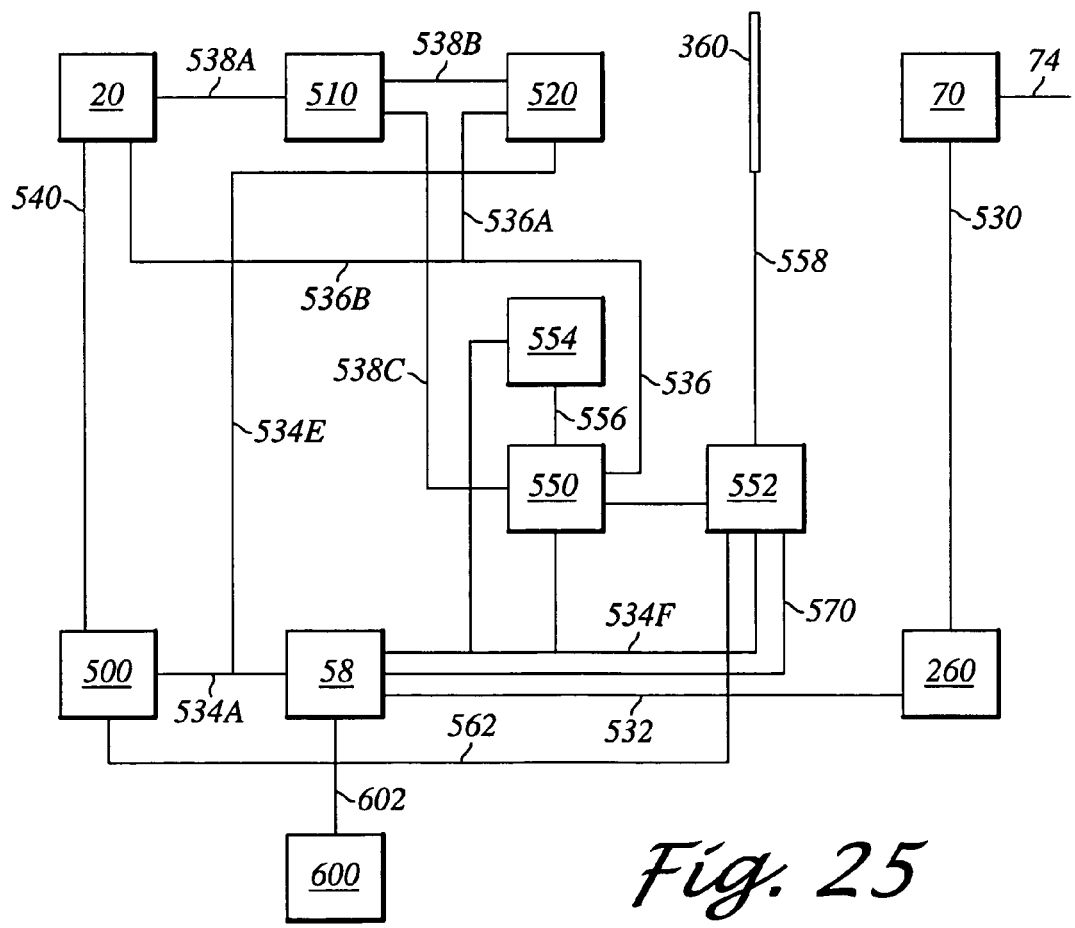
FIG. 25 is a schematic of another embodiment of the surveillance system of the present invention.

Referring to FIG. 25, an alternative embodiment to the present invention is illustrated. The features that are in common with the system shown in FIG. 24 bear the same figure numbers in FIG. 25 and their description and operation will not be repeated again here. Power to a motion detector 510 and the lighting device 520 is via electrical power line 334E which feeds off of line 534A. The system of FIG. 25 includes a wireless receiver/transmitter 552, an alarm system 550, a tampering detector 554, and a wireless antenna 560. Power to the receiver/transmitter 552, the alarm system 550 and the tampering detector 554 is via line 534F from the distribution panel 58. In this system, the motion detector, when it detects motion, sends a signal to the alarm system 550. The alarm system can send a signal to turn on the camera and turn on the light device via lines 336, 336B, and 336A if the camera and/or light device is not already on. Most digital cameras remain on 100 percent of the time, and in the preferred embodiment, the lights remain on 100 percent of the time during night hours. In this preferred embodiment, the alarm control 550 does not have to signal to turn on the camera or turn on the light device. The lighting device is normally turned on by a photoelectric cell which turns the lighting device on at dusk and turns the lighting device off at dawn. Similarly, the camera can be controlled by a photoelectric cell which turns the camera on at dusk and turns it off at dawn or vice versa.

The surveillance equipment can be utilized on a 24-hour basis and the camera can be set up to be turned on for 24 hours and the lighting device turned on during the hours of darkness. In this latter option, the motion detector will not necessarily control of the camera and the lighting device. However, the motion sensor can signal the alarm system to notify a control station that motion has been detected, the photo cell can send a signal to the alarm control 550. The alarm control sends a signal to the wireless receiver/transmitter 552 which sends out a signal from antenna 560 and via line 558.

The entry door to the base hollow enclosure can be fitted with a tampering detector 554. When the entry door is vibrated or when the entry door is removed, the tampering detector 554 sends a signal to the alarm control 550 via line 556 which sends a tampering signal to the wireless receiver/transmitter 552 which sends a signal to the control station via antenna 560 and line 558. When there is a power failure, a signal can be sent from the distribution panel 58 to the alarm control 550 that the external power to the surveillance system is off and the system is operating on standby power, normally a battery source 600. The signal is sent to the wireless receiver/transmitter which transmits a signal to the control station.

Images from the camera 20 can also be transmitted to the control station via lines 540 and 562 so the control station can monitor camera views. This is useful if the control station desires to change a camera control such as contrast, zooming in and out, panning, and the like. The control station can interrogate and control the surveillance system by wireless.

Although the above-identified surveillance system has been illustrated with a wireless receiver/transmitter communications system, the above-identified system can also be hardwired such as a hardwire to a telephone line, wherein the wireless receiver/transmitter is replaced by a communications controller which replaces the wireless receiver/transmitter 552. The communication controller is hard wired to the local telephone system or network and dials up the control station via a telephone line and transmits data, and vice versa, the control station can dial up the surveillance system to interrogate the surveillance system, review camera images, control the cameras, and the like, as discussed above. The surveillance system in turn can signal the control station when motion is detected by the motion detector and/or the tampering detector has detected tampering of the entry door.

When the external power source is cut off and the system relies on the backup power 600 via line 602, the signal from the distribution box can be sent to the communication controller to notify the control station of the primary power failure via a telephone line.

While this invention has been described with respect to various specific examples and embodiments, it is to be understood that the invention is not limited thereto, and that it can be variously practiced within the scope of the following claims.

What is claimed is:

1. A surveillance system comprising:
   a surveillance assembly, including a platform and surveillance equipment mounted to the platform for providing observations of an area in a vicinity of the surveillance system;
   a base, including a hollow enclosure sized and adapted to contain electronics equipment for controlling the surveillance equipment and a power supply for powering the electronics equipment and the surveillance equipment;
   a substantially hollow support pole having an upper portion mounted to the surveillance assembly and a lower portion mounted to the base;
   means, disposed through the support pole, for functionally connecting the surveillance equipment to the electronics equipment contained in the base; and
   a current breaker disposed inside the base enclosure adapted to provide electrical power from a power supply to the surveillance equipment and the electronics equipment;
   wherein the surveillance assembly further includes a power distribution box mounted on the support pole near the platform adapted to receive a power supply line from an external power supply to supply electrical power to the current breaker for distribution of electrical power to a distribution box for distribution of the electrical power to the electronics equipment and surveillance equipment.

2. The system according to claim 1 wherein the surveillance equipment comprises a plurality of cameras, the base comprises a concrete structure having a weight sufficient to prevent the base from being manually displaced, and the means for connecting the electronics equipment with the surveillance equipment includes wiring disposed at least partially through the substantially hollow support pole.

3. The transportable unmanned surveillance system comprising:
   a base configured to maintain the transportable unmanned surveillance system in an upright freestanding position and to substantially prevent movenemt of the base by hand;
   a camera position above the base at a height sufficient to put the camera substantially out of reach of a person who may want to tamper with the camera, the camera configured to obtain video data of objects in the vicinity of the surveillance system;
   a support structure coupled to the base and extending upwardly, wherein the camera is coupled to the support structure;
   a recorded in wireless communication with the camere, such that the recorder is configured to record wiresess transmissions of the video data obtained from the camera with out human intervention during ongoing surveillance; and
   a sedure enclosure configured to protect the recorder from unauthorized access, wherein the recorder is positioned within the secure enclosure, wherein the secure enclosure is coupled to the support structure and positioned above the base.

4. The transportable unmanned surveillance system of claim 3, further comprising electronics equipment for communicating with a network of surveillance system.

5. The transportable unmanned surveillance system of claim 3, further comprising electronics equipment for communicating with remote users of the surveillance system.

6. The transportable unmanned surveillance system of claim 3, further comprising electronics equipment for communicating via the Internet.

7. The transportable unmanned surveillance system of claim 3, where in the surveillance system is configured to be powered by an electrical connection to a power pole.

8. The transportable unmanned surveillance system of claim 3, wherein the height sufficient to put the camera substantially out of reach of a person who may want to tamper with the camera is about 12 feet high.

9. The transportable unmanned surveillance system of claim 3, wherein the surveillance system weighs more than about 1000 pounds and has an average density of at least about 20 pounds per cubic foot.

10. The transportable unmanned surveillance system of claim 3, further comprising at least one of a microphone, a motion sensor, a light, and a speaker.

11. The transportable unmanned surveillance system comprising:
    a base configured to maintain the transportable unmanned surveillance system in an upright freestanding position and to substantially prevent movenemt of the base by hand, wherein the base configured with an axle and wheels to facilitate transportation of the surveillance system;
    a camera position above the base at a height sufficient to put the camera substantially out of reach of a person who may want to tamper with the camera, the camera configured to obtain video data of objects in the vicinity of the surveillance system;
    a support structure coupled to the base and extending upwardly, wherein the camera is coupled to the support structure;
    a recorder in communication with the camera, the recorder configured to record the video data obtained by the camera without human intervention during ongoing surveillance;
    a secure enclosure configured to protect the recorder from unauthorized acccess, wherein the recorder is position within the secure enclosure, wherein the secure enclosure is coupled to the support and positioned above the base.

12. The transportable unmanned surveillance system of claim 11, wherein the recorder is in wireless communication with the camere, such that the recorder is configured to record wiresess transmissions of the video data obtained from the camera with out human intervention during ongoing surveillance.

13. The transportable unmanned surveillance system of claim 11, further comprising electronics equipment for communicating with a network of surveillance systems.

14. The transportable unmanned surveillance system of claim 11, further comprising electronics equipment for communicating with remote users of the surveillance system.

15. The transportable unmanned surveillance system of claim 11, further comprising electronics equipment for communicating via the Internet.

16. The transportable unmanned surveillance system of claim 11, where in the surveillance system is configured to be powered by an electrical connection to a power pole.

17. The transportable unmanned surveillance system of claim 11, wherein the height sufficient to put the camera substantially out of reach of a person who may want to tamper with the camera is about 12 feet high.

18. The transportable unmanned surveillance system of claim 11, wherein the surveillance system weighs more than about 1000 pounds and has an average density of at least about 20 pounds per cubic foot.

19. The transportable unmanned surveillance system of claim 11, further comprising at least one of a microphone, a motion sensor, a light, and a speaker.

20. A transportable unmanned surveillance system adapted to obtain video data of objects in the vicinity of the surveillance system and process the video data obtained during ongoing surveillance, the surveillance system comprising:

a trailer sized and adapted to support the transportable unmanned surveillance system and configured for enabling the transportable unmanned surveillance system to be towed by a motor vehicle, the trailer comprising a trailer frame, an axle coupled to the trailer frame, the axle configured to be coupled to a plurality of wheels, and a hitch coupled to the trailer frame;

a base coupled to the trailer, the trailer and base configured to support the transportable unmanned surveillance system on a ground surface and to substantially prevent unauthorized movement of the surveillance system;

a camera positioned above the base at a height sufficient to put the camera substantially out of reach of an unassisted person standing on the ground surface, the camera configured to obtain video data of objects in the vicinity of the surveillance system;

a support structure coupled to the base and extending upwardly, wherein the camera is coupled to the support structure; and electronics equipment comprising a control module, a data storage device, and a communications system to communicate with an external control station at a remote location, wherein, the camera, the control module, the data storage device, the communications system and the external control station are communicatively coupled to enable communication between at least two of the camera, the control module, the data storage device, the communications system and the external control station, the control module controls one or more data input and data output devices of the surveillance system, the one or more data input and data output devices comprising the camera, the camera transmits data in a secure manner to the data storage device for storage such that the transmission of data from the camera to the data storage device is substantially protected from unauthorized access and disruption by an unassisted person standing on the ground surface, and the communications system receives data from and transmits data to the external control station.

21. The transportable unmanned surveillance system of claim 20, wherein the trailer comprises a jack configured to provide support for the surveillance system and to stabilize the surveillance system during use.

22. The transportable unmanned surveillance system of claim 20, wherein the trailer comprises a plurality of wheels coupled to the axle.

23. The transportable unmanned surveillance system of claim 20, wherein the camera is positioned at least about 12 feet high.

24. The transportable unmanned surveillance system of claim 20, wherein the camera is positioned at least about 20 feet high.

25. The transportable unmanned surveillance system of claim 20, wherein the support structure has an adjustable height.

26. The transportable unmanned surveillance system of claim 20, wherein the support structure comprises a plurality of segments.

27. The transportable unmanned surveillance system of claim 20, wherein the support structure comprises telescoping segments.

28. The transportable unmanned surveillance system of claim 20, wherein the control module is configured to monitor and modify the function of the camera.

29. The transportable unmanned surveillance system of claim 20, wherein the control module is configured to monitor and modify the function of the one or more data input and data output devices comprising at least one of a camera, a microphone, a sound detector, a tampering detector, a motion sensor, an alarm system, a light, a speaker, a timer, an amplifier, a digital recorder, a video recorder, a computer, a communications transmitter, a communications receiver, an antenna, and a power supply.

30. The transportable unmanned surveillance system of claim 29, wherein the control module is configured to execute control signals from the external control station to control the function of the one or more data input and data output devices.

31. The transportable unmanned surveillance system of claim 20, wherein the data storage device comprises a recorder located in a secure enclosure of the surveillance system.

32. The transportable unmanned surveillance system of claim 20, wherein the data storage device comprises a recorder located in the base of the surveillance system.

33. The transportable unmanned surveillance system of claim 20, wherein the data storage device comprises a recorder located at the external control station.

34. The transportable unmanned surveillance system of claim 20, wherein the data storage device comprises a recorder located at a remote location.

35. The transportable unmanned surveillance system of claim 20, wherein the communications system comprises at least one of a communications controller, a transmitter, a receiver, a transceiver, and an antenna.

36. The transportable unmanned surveillance system of claim 20, wherein the communications system communicates with the external control station at least partially via a wired medium.

37. The transportable unmanned surveillance system of claim 20, wherein the communications system communicates with the external control station at least partially via wireless transmissions.

38. The transportable unmanned surveillance system of claim 20, wherein at least two of the camera, the control module, the data storage device, the communications system and the external control station are communicatively coupled via a cable at least a portion of which is positioned within a hollow portion of the support structure.

39. The transportable unmanned surveillance system of claim 20, wherein at least two of the camera, the control module, the data storage device, the communications system and the external control station are communicatively coupled via a cable at least a portion of which is positioned substantially out of reach of an unassisted person standing on the ground surface.

40. The transportable unmanned surveillance system of claim 20, wherein at least two of the camera, the control module, the data storage device, the communications system and the external control station are communicatively coupled via a cable at least a portion of which is supported on a utility pole.

41. The transportable unmanned surveillance system of claim 20, wherein at least two of the camera, the control module, the data storage device, the communications system and the external control station are communicatively coupled via at least one of a wireless transmission, a satellite connection, a cell phone transmission, a telecommunications line, a computer network, a radio frequency transmission, and a microwave transmission.

42. The transportable unmanned surveillance system of claim 20, further comprising a power distribution system configured to transmit power to at least one of the camera, the control module, the data storage device, the communications system and the external control station, wherein the power distribution system is configured to substantially protect the transmission of power from unauthorized disruption by an unassisted person standing on the ground surface.

43. The transportable unmanned surveillance system of claim 20, further comprising a power distribution system comprising at least one of a power supply line, a connection to a utility power supply, a generator, a battery, a solar collector, a distribution box, an uninterruptable power supply, a circuit breaker, and a fuse.

* * * * *